US010520645B2

(12) United States Patent
Radich et al.

(10) Patent No.: US 10,520,645 B2
(45) Date of Patent: Dec. 31, 2019

(54) METHOD AND SYSTEM FOR PREDICTING THE FINANCIAL IMPACT OF FORECASTED WEATHER CONDITIONS

(71) Applicant: Accuweather, Inc., State College, PA (US)

(72) Inventors: Rosemary Y. Radich, Wichita, KS (US); Tim Loftus, Wichita, KS (US); Jennifer Bowers, Wichita, KS (US); Paul Roehsner, State College, PA (US); Paul Raymond, State College, PA (US); Michael R. Root, Edmond, OK (US)

(73) Assignee: Accuweather, Inc., State College, PA (US)

( * ) Notice: Subject to any disclaimer, the term of this patent is extended or adjusted under 35 U.S.C. 154(b) by 127 days.

(21) Appl. No.: 15/609,650

(22) Filed: May 31, 2017

(65) Prior Publication Data

US 2017/0343702 A1     Nov. 30, 2017

Related U.S. Application Data

(60) Provisional application No. 62/343,547, filed on May 31, 2016.

(51) Int. Cl.
*G01W 1/10* (2006.01)
(52) U.S. Cl.
CPC ..................... *G01W 1/10* (2013.01)
(58) Field of Classification Search
CPC .................. G01W 1/10; G01W 1/02
(Continued)

(56) References Cited

U.S. PATENT DOCUMENTS

| 5,331,330 A | 7/1994 | Susnjara |
|---|---|---|
| 6,177,873 B1 | 1/2001 | Cragun |

(Continued)

FOREIGN PATENT DOCUMENTS

| CN | 103530527 A | 1/2014 |
|---|---|---|
| CN | 104583810 A | 4/2015 |

(Continued)

OTHER PUBLICATIONS

Notification Concerning Transmittal of International Preliminary Report on Patentability issued in PCT/US2014/055004 dated Mar. 14, 2017.

(Continued)

*Primary Examiner* — John H Le
(74) *Attorney, Agent, or Firm* — Blank Rome LLP

(57) ABSTRACT

A system and method of predicting the impact of forecasted weather, environmental, and geologic events (that include one or more weather/environmental/geologic conditions) by determining a recurrence interval of each past condition in each location, determining the correlation between the past condition and the observable impact of the past event, calculating a predicted observable impact of each past event, calculating a predicted impact of each past event recurring by multiplying the predicted observable impact of the past event by the recurrence interval of the past condition, grouping the past events into a plurality of groups based on the predicted impact of the past condition recurring, determining a threshold for each group, receiving forecasted conditions, and determining the predicted impact of the forecasted conditions by comparing the forecasted conditions with the thresholds.

20 Claims, 16 Drawing Sheets

(58) Field of Classification Search
USPC .............. 702/3; 345/473; 701/117; 705/14.5
See application file for complete search history.

(56) References Cited

U.S. PATENT DOCUMENTS

| | | | |
|---|---|---|---|
| 6,373,396 B2 | 4/2002 | Zamfes | |
| 6,535,817 B1* | 3/2003 | Krishnamurti | G01W 1/10 |
| | | | 702/3 |
| 7,016,785 B2 | 3/2006 | Makela et al. | |
| 7,080,018 B1 | 7/2006 | Fox et al. | |
| 7,181,345 B2 | 2/2007 | Rosenfeld et al. | |
| 7,254,484 B2 | 8/2007 | Jantunen et al. | |
| 7,461,137 B2 | 12/2008 | Ryan et al. | |
| 7,515,087 B1 | 4/2009 | Woodell et al. | |
| 7,542,852 B1* | 6/2009 | Rose | G01W 1/02 |
| | | | 702/3 |
| 7,751,978 B1 | 7/2010 | Neilley et al. | |
| 7,869,953 B1 | 1/2011 | Kelly | |
| 8,588,821 B1 | 11/2013 | Hewinson | |
| 8,990,333 B2 | 3/2015 | Johnson et al. | |
| 9,196,145 B2 | 11/2015 | Guatteri et al. | |
| 9,459,117 B2 | 10/2016 | Baig | |
| 2001/0030624 A1 | 10/2001 | Schwoegler | |
| 2003/0107490 A1 | 6/2003 | Sznaider et al. | |
| 2004/0043760 A1 | 3/2004 | Rosenfeld et al. | |
| 2005/0197776 A1 | 9/2005 | Makela et al. | |
| 2005/0258971 A1 | 11/2005 | Greenstein et al. | |
| 2006/0022846 A1 | 2/2006 | Tummala | |
| 2007/0073841 A1 | 3/2007 | Ryan et al. | |
| 2007/0088504 A1 | 4/2007 | Jantunen et al. | |
| 2007/0162328 A1 | 7/2007 | Reich | |
| 2008/0147417 A1 | 6/2008 | Friedberg | |
| 2009/0210353 A1 | 8/2009 | Mitchell et al. | |
| 2009/0292470 A1 | 11/2009 | Curry | |
| 2010/0238179 A1 | 9/2010 | Kelly | |
| 2011/0004511 A1 | 1/2011 | Reich | |
| 2011/0054776 A1 | 3/2011 | Petrov et al. | |
| 2011/0062968 A1 | 3/2011 | Renno et al. | |
| 2011/0099065 A1 | 4/2011 | Georgis et al. | |
| 2011/0128144 A1 | 6/2011 | Baron, Sr. et al. | |
| 2012/0101880 A1* | 4/2012 | Alexander | G06Q 30/02 |
| | | | 705/14.5 |
| 2013/0009906 A1 | 1/2013 | Posamentier | |
| 2015/0042479 A1 | 2/2015 | Muetzel | |
| 2015/0178572 A1 | 6/2015 | Omer et al. | |
| 2015/0309895 A1 | 10/2015 | Tanimoto et al. | |
| 2016/0231463 A1 | 8/2016 | Smith | |
| 2016/0300172 A1 | 10/2016 | Bangalore et al. | |

FOREIGN PATENT DOCUMENTS

| | | |
|---|---|---|
| CN | 105334551 A | 2/2016 |
| JP | 200510166 A | 1/2005 |
| JP | 2006520497 A | 9/2006 |
| JP | 2008185489 A | 8/2008 |
| JP | 2011626709 A | 10/2011 |
| JP | 2013147131 A | 8/2013 |
| KR | 100782122 B | 12/2007 |
| MY | 135780 A | 6/2008 |
| TW | 201539019 A | 10/2015 |
| WO | WO-0237332 A2 | 5/2002 |
| WO | WO-2004036476 A1 | 4/2004 |
| WO | WO-2007042600 A1 | 4/2007 |
| WO | 2016039741 A1 | 3/2016 |
| WO | WO-2016029929 A1 | 3/2016 |
| WO | WO-2016039741 A | 3/2016 |

OTHER PUBLICATIONS

H. Bloemink, "Static Electricity Measurements for Lightning Warnings—An Exploration"; Royal Netherlands Meteorological Institute; De Bilt, 2013, pp. 1-23.

International Search Report for PCT/US2015/040697 dated Nov. 23, 2015, 3 pages.

J.L. Levere; "Cruise Ship Campaign Aims at Vacationers Tired of Snow", <http://www.nytimes.com/2004/12/28/business/media/28adco.html?_r=0>; 3 pages.

H. Thomases; "Rain or Shine, Weather-Triggered Advertising Is Fine"; 3 pages<http://www.clickz.com/clickz/column/1710140/rain-shine-weather-triggered-advertising-is-fine>.

International Search Report and Written Opinion issued in PCT/US17/35170 dated Aug. 11, 2017.

English translation of Chinese Publication No. CN103530527; Publication Date: Jan. 22, 2014; 19 pages.

English translation of Chinese Publication No. CN104583810; Publication Date: Apr. 29, 2015; 19 pages.

English translation of Chinese Publication No. CN105334551; Publication Date: Feb. 17, 2016; 15 pages.

* cited by examiner

| METAR | NMETAR | DATE | SNOWFALL | POPULATION | ELEVATION | IMPACT | SNOW_EVENTS | MAGNITUDE | N | R | T | P | PE | PE_VAR | W_IMPACT | P_IMPACT | IMPACT_VALUE | IMPACT_INDICATOR |
|---|---|---|---|---|---|---|---|---|---|---|---|---|---|---|---|---|---|---|
| KALS | 120 | 2/22/2015 | 9.2 | 15877 | 7539 | 2000000 | 237 | 1 | 10 | 10 | 11.0000 | 0.0909 | 1.0000 | 1 | 125.9684 | 624.0193 | 6864.2128 | 10 |
| KALS | 120 | 4/12/2009 | 7.1 | 15877 | 7539 | 50000000 | 237 | 2 | 10 | 10 | 5.5000 | 0.1818 | 1.0000 | 1 | 3149.2095 | 469.0578 | 2579.8178 | 10 |
| KALS | 120 | 3/26/2016 | 7 | 15877 | 7539 | | 237 | 4 | 10 | 10 | 2.7500 | 0.3636 | 1.0000 | 1 | | 461.6787 | 1269.6163 | 10 |
| KALS | 120 | 4/16/2016 | 7 | 15877 | 7539 | | 237 | 4 | 10 | 10 | 2.7500 | 0.3636 | 1.0000 | 1 | | 461.6787 | 1269.6163 | 10 |
| KALS | 120 | 11/22/2013 | 7 | 15877 | 7539 | 5000000 | 237 | 4 | 10 | 10 | 2.7500 | 0.3636 | 1.0000 | 1 | 314.9210 | 461.6787 | 1269.6163 | 10 |
| KALS | 120 | 2/5/2008 | 6.7 | 15877 | 7539 | | 237 | 6 | 10 | 10 | 1.8333 | 0.5455 | 0.9977 | 1 | | 439.5413 | 805.8257 | 9 |
| KALS | 120 | 11/25/2013 | 5.5 | 15877 | 7539 | | 237 | 7 | 10 | 10 | 1.5714 | 0.6364 | 0.9891 | 1 | | 350.9918 | 551.5586 | 8 |
| KALS | 120 | 1/8/2016 | 5.3 | 15877 | 7539 | | 237 | 8 | 10 | 10 | 1.3750 | 0.7273 | 0.9586 | 1 | | 336.2336 | 462.3212 | 8 |
| KALS | 120 | 11/24/2013 | 5.2 | 15877 | 7539 | 8500000 | 237 | 9 | 10 | 10 | 1.2222 | 0.8182 | 0.8656 | 1 | 535.3656 | 328.8545 | 401.9332 | 8 |
| KALS | 120 | 3/24/2007 | 4.7 | 15877 | 7539 | | 237 | 10 | 10 | 10 | 1.1000 | 0.9091 | 0.6145 | 1 | | 291.9589 | 321.1547 | 8 |
| KALS | 120 | 12/21/2007 | 4.5 | 15877 | 7539 | | 237 | 11 | 10 | 10 | 1.0000 | 1.0000 | 0.0000 | 0 | | 277.2006 | 277.2006 | 8 |
| KALS | 120 | 10/21/2009 | 4.2 | 15877 | 7539 | | 237 | 12 | 10 | 10 | 0.9167 | 1.0909 | -1.3872 | 0 | | 255.0632 | 233.8080 | 8 |
| KALS | 120 | 12/20/2006 | 4 | 15877 | 7539 | 45000 | 237 | 13 | 10 | 10 | 0.8462 | 1.1818 | -4.3150 | 0 | 2.8343 | 240.3050 | 203.3350 | 8 |
| KALS | 120 | 3/26/2009 | 3.7 | 15877 | 7539 | | 237 | 14 | 10 | 10 | 0.7857 | 1.2727 | -10.1520 | 0 | | 218.1676 | 171.4174 | 7 |
| KALS | 120 | 4/24/2007 | 3.6 | 15877 | 7539 | 6550 | 237 | 15 | 10 | 10 | 0.7333 | 1.3636 | -21.2324 | 0 | 0.4125 | 210.7885 | 154.5782 | 7 |
| KALS | 120 | 10/15/2013 | 3.5 | 15877 | 7539 | | 237 | 16.5 | 10 | 10 | 0.6667 | 1.5000 | -56.6650 | 0 | | 203.4094 | 135.6063 | 7 |
| KALS | 120 | 1/21/2010 | 3.5 | 15877 | 7539 | | 237 | 16.5 | 10 | 10 | 0.6667 | 1.5000 | -56.6650 | 0 | | 203.4094 | 135.6063 | 7 |
| KALS | 120 | 4/17/2008 | 3.3 | 15877 | 7539 | | 237 | 20 | 10 | 10 | 0.5500 | 1.8182 | -393.7963 | 0 | | 188.6512 | 103.7581 | 7 |
| KALS | 120 | 11/23/2007 | 3.3 | 15877 | 7539 | | 237 | 20 | 10 | 10 | 0.5500 | 1.8182 | -393.7963 | 0 | | 188.6512 | 103.7581 | 7 |
| KALS | 120 | 12/9/2012 | 3.3 | 15877 | 7539 | | 237 | 20 | 10 | 10 | 0.5500 | 1.8182 | -393.7963 | 0 | | 188.6512 | 103.7581 | 7 |
| KALS | 120 | 12/31/2012 | 3.3 | 15877 | 7539 | | 237 | 20 | 10 | 10 | 0.5500 | 1.8182 | -393.7963 | 0 | | 188.6512 | 103.7581 | 7 |
| KALS | 120 | 11/16/2015 | 3.3 | 15877 | 7539 | 10000 | 237 | 20 | 10 | 10 | 0.5500 | 1.8182 | -393.7963 | 0 | 0.6298 | 188.6512 | 103.7581 | 7 |
| KALS | 120 | 1/31/2007 | 3.2 | 15877 | 7539 | | 237 | 23.5 | 10 | 10 | 0.4681 | 2.1364 | -1979.3948 | 0 | | 181.2720 | 84.8507 | 7 |
| KALS | 120 | 3/11/2010 | 3.2 | 15877 | 7539 | | 237 | 23.5 | 10 | 10 | 0.4681 | 2.1364 | -1979.3948 | 0 | | 181.2720 | 84.8507 | 7 |
| KALS | 120 | 3/9/2013 | 3.1 | 15877 | 7539 | | 237 | 25.5 | 10 | 10 | 0.4314 | 2.3182 | -4481.0320 | 0 | | 173.8929 | 75.0126 | 7 |
| KALS | 120 | 4/18/2016 | 3.1 | 15877 | 7539 | | 237 | 25.5 | 10 | 10 | 0.4314 | 2.3182 | -4481.0320 | 0 | | 173.8929 | 75.0126 | 7 |
| KALS | 120 | 11/8/2011 | 3 | 15877 | 7539 | | 237 | 28.5 | 10 | 10 | 0.3860 | 2.5909 | -13629.8126 | 0 | | 166.5138 | 64.2685 | 7 |
| KALS | 120 | 2/8/2011 | 3 | 15877 | 7539 | | 237 | 28.5 | 10 | 10 | 0.3860 | 2.5909 | -13629.8126 | 0 | | 166.5138 | 64.2685 | 7 |
| KALS | 120 | 12/14/2012 | 3 | 15877 | 7539 | | 237 | 28.5 | 10 | 10 | 0.3860 | 2.5909 | -13629.8126 | 0 | | 166.5138 | 64.2685 | 7 |
| KALS | 120 | 12/29/2013 | 3 | 15877 | 7539 | | 237 | 28.5 | 10 | 10 | 0.3860 | 2.5909 | -13629.8126 | 0 | | 166.5138 | 64.2685 | 7 |
| KALS | 120 | 11/10/2008 | 2.8 | 15877 | 7539 | | 237 | 31.5 | 10 | 10 | 0.3492 | 2.8636 | -37082.3266 | 0 | | 151.7555 | 52.9940 | 7 |
| KALS | 120 | 4/13/2007 | 2.8 | 15877 | 7539 | | 237 | 31.5 | 10 | 10 | 0.3492 | 2.8636 | -37082.3266 | 0 | | 151.7555 | 52.9940 | 7 |
| KALS | 120 | 12/28/2006 | 2.7 | 15877 | 7539 | | 237 | 33.5 | 10 | 10 | 0.3284 | 3.0455 | -68630.1409 | 0 | | 144.3764 | 47.4072 | 7 |
| KALS | 120 | 1/28/2010 | 2.7 | 15877 | 7539 | 4000 | 237 | 33.5 | 10 | 10 | 0.3284 | 3.0455 | -68630.1409 | 0 | 0.2519 | 144.3764 | 47.4072 | 7 |
| KALS | 120 | 3/24/2010 | 2.6 | 15877 | 7539 | | 237 | 36 | 10 | 10 | 0.3056 | 3.2727 | -140959.7352 | 0 | | 136.9973 | 41.8603 | 7 |
| KALS | 120 | 12/18/2006 | 2.6 | 15877 | 7539 | | 237 | 36 | 10 | 10 | 0.3056 | 3.2727 | -140959.7352 | 0 | | 136.9973 | 41.8603 | 7 |
| KALS | 120 | 4/29/2016 | 2.6 | 15877 | 7539 | | 237 | 36 | 10 | 10 | 0.3056 | 3.2727 | -140959.7352 | 0 | | 136.9973 | 41.8603 | 7 |
| KALS | 120 | 12/12/2015 | 2.5 | 15877 | 7539 | | 237 | 40 | 10 | 10 | 0.2750 | 3.6364 | -404270.4403 | 0 | | 129.6182 | 35.6450 | 6 |
| KALS | 120 | 4/17/2016 | 2.5 | 15877 | 7539 | | 237 | 40 | 10 | 10 | 0.2750 | 3.6364 | -404270.4403 | 0 | | 129.6182 | 35.6450 | 6 |
| KALS | 120 | 12/11/2007 | 2.5 | 15877 | 7539 | | 237 | 40 | 10 | 10 | 0.2750 | 3.6364 | -404270.4403 | 0 | | 129.6182 | 35.6450 | 6 |
| KALS | 120 | 3/27/2009 | 2.5 | 15877 | 7539 | | 237 | 40 | 10 | 10 | 0.2750 | 3.6364 | -404270.4403 | 0 | | 129.6182 | 35.6450 | 6 |
| KALS | 120 | 3/19/2010 | 2.5 | 15877 | 7539 | | 237 | 40 | 10 | 10 | 0.2750 | 3.6364 | -404270.4403 | 0 | | 129.6182 | 35.6450 | 6 |
| KALS | 120 | 2/23/2015 | 2.4 | 15877 | 7539 | | 237 | 43 | 10 | 10 | 0.2558 | 3.9091 | -833215.1981 | 0 | | 122.2391 | 31.2705 | 6 |
| KALS | 120 | 4/5/2014 | 2.3 | 15877 | 7539 | | 237 | 44 | 10 | 10 | 0.2500 | 4.0000 | -1048575.0000 | 0 | | 114.8599 | 28.7150 | 6 |
| KALS | 120 | 12/9/2008 | 2.2 | 15877 | 7539 | | 237 | 45.5 | 10 | 10 | 0.2418 | 4.1364 | -1466178.4056 | 0 | | 107.4808 | 25.9844 | 6 |
| KALS | 120 | 2/23/2016 | 2.2 | 15877 | 7539 | | 237 | 45.5 | 10 | 10 | 0.2418 | 4.1364 | -1466178.4056 | 0 | | 107.4808 | 25.9844 | 6 |
| KALS | 120 | 1/30/2015 | 2.1 | 15877 | 7539 | 10000 | 237 | 47 | 10 | 10 | 0.2340 | 4.2727 | -2027923.2463 | 0 | 0.6298 | 100.1017 | 23.4281 | 6 |
| KALS | 120 | 2/7/2012 | 2 | 15877 | 7539 | | 237 | 50 | 10 | 10 | 0.2200 | 4.5455 | -3765070.1858 | 0 | | 92.7226 | 20.3990 | 6 |
| KALS | 120 | 12/25/2007 | 2 | 15877 | 7539 | | 237 | 50 | 10 | 10 | 0.2200 | 4.5455 | -3765070.1858 | 0 | | 92.7226 | 20.3990 | 6 |
| ... | ... | ... | ... | ... | ... | ... | ... | ... | ... | ... | ... | ... | ... | ... | ... | ... | ... | ... |

FIG. 4

| METAR | NMETAR | DATE | SNOWFALL | POPULATION | ELEVATION | IMPACT | SNOW_EVENTS | MAGNITUDE | N | R | T | P | PE | PE_VAR | W_IMPACT | P_IMPACT | IMPACT_VALUE | IMPACT_INDICATOR |
|---|---|---|---|---|---|---|---|---|---|---|---|---|---|---|---|---|---|---|
| K3LF | 69 | 1/28/2009 | 6.8 | 30323 | 689 | 10000 | 269 | 1 | 10 | 10 | 11.0000 | 0.0909 | 1.0000 | 1 | 0.3298 | 446.9204 | 4916.1246 | 10 |
| K3LF | 69 | 12/24/2008 | 6.1 | 30323 | 689 | 160000 | 269 | 2 | 10 | 10 | 5.5000 | 0.1818 | 1.0000 | 1 | 5.2765 | 395.2666 | 2173.9661 | 10 |
| K3LF | 69 | 1/7/2010 | 4.5 | 30323 | 689 |  | 269 | 3 | 10 | 10 | 3.6667 | 0.2727 | 1.0000 | 1 |  | 277.2006 | 1016.4022 | 10 |
| K3LF | 69 | 12/21/2013 | 4.3 | 30323 | 689 |  | 269 | 4.5 | 10 | 10 | 2.4444 | 0.4091 | 0.9999 | 1 |  | 262.4424 | 641.5258 | 9 |
| K3LF | 69 | 1/13/2007 | 4.3 | 30323 | 689 | 5000 | 269 | 4.5 | 10 | 10 | 2.4444 | 0.4091 | 0.9999 | 1 | 0.1649 | 262.4424 | 641.5258 | 9 |
| K3LF | 69 | 2/13/2007 | 4.2 | 30323 | 689 | 10000 | 269 | 6 | 10 | 10 | 1.8333 | 0.5455 | 0.9977 | 1 | 0.3298 | 255.0632 | 467.6160 | 8 |
| K3LF | 69 | 2/1/2008 | 4.1 | 30323 | 689 | 20000 | 269 | 7 | 10 | 10 | 1.5714 | 0.6364 | 0.9891 | 1 | 0.6596 | 247.6841 | 389.2179 | 8 |
| K3LF | 69 | 12/9/2009 | 3.9 | 30323 | 689 | 65000 | 269 | 8 | 10 | 10 | 1.3750 | 0.7273 | 0.9586 | 1 | 2.1436 | 232.9259 | 320.2731 | 8 |
| K3LF | 69 | 2/17/2006 | 3.4 | 30323 | 689 |  | 269 | 9.5 | 10 | 10 | 1.1579 | 0.8636 | 0.7692 | 1 |  | 196.0303 | 226.9824 | 8 |
| K3LF | 69 | 12/9/2005 | 3.4 | 30323 | 689 | 15000 | 269 | 9.5 | 10 | 10 | 1.1579 | 0.8636 | 0.7692 | 1 | 0.4947 | 196.0303 | 226.9824 | 8 |
| K3LF | 69 | 12/31/2009 | 3.2 | 30323 | 689 |  | 269 | 11 | 10 | 10 | 1.0000 | 1.0000 | 0.0000 | 0 |  | 181.2720 | 181.2720 | 8 |
| K3LF | 69 | 2/10/2010 | 3.1 | 30323 | 689 |  | 269 | 12.5 | 10 | 10 | 0.8800 | 1.1364 | -2.5907 | 0 |  | 173.8929 | 153.0258 | 7 |
| K3LF | 69 | 2/26/2013 | 3.1 | 30323 | 689 |  | 269 | 12.5 | 10 | 10 | 0.8800 | 1.1364 | -2.5907 | 0 |  | 173.8929 | 153.0258 | 7 |
| K3LF | 69 | 12/25/2009 | 2.7 | 30323 | 689 |  | 269 | 14.5 | 10 | 10 | 0.7586 | 1.3182 | -14.8399 | 0 |  | 144.3764 | 109.5269 | 7 |
| K3LF | 69 | 12/10/2007 | 2.7 | 30323 | 689 | 250000 | 269 | 14.5 | 10 | 10 | 0.7586 | 1.3182 | -14.8399 | 0 | 8.2446 | 144.3764 | 109.5269 | 7 |
| K3LF | 69 | 1/21/2007 | 2.6 | 30323 | 689 |  | 269 | 16 | 10 | 10 | 0.6875 | 1.4545 | -41.3909 | 0 |  | 136.9973 | 94.1856 | 7 |
| K3LF | 69 | 12/16/2007 | 2.5 | 30323 | 689 | 25000 | 269 | 17 | 10 | 10 | 0.6471 | 1.5455 | -76.7253 | 0 | 0.8245 | 129.6182 | 83.8706 | 7 |
| K3LF | 69 | 3/21/2006 | 2.4 | 30323 | 689 |  | 269 | 18.5 | 10 | 10 | 0.5946 | 1.6818 | -180.0466 | 0 |  | 122.2391 | 72.6827 | 7 |
| K3LF | 69 | 2/5/2014 | 2.4 | 30323 | 689 | 35000 | 269 | 18.5 | 10 | 10 | 0.5946 | 1.6818 | -180.0466 | 0 | 1.1542 | 122.2391 | 72.6827 | 7 |
| K3LF | 69 | 2/15/2010 | 2.2 | 30323 | 689 |  | 269 | 21 | 10 | 10 | 0.5238 | 1.9091 | -642.0816 | 0 |  | 107.4808 | 56.2995 | 7 |
| K3LF | 69 | 2/8/2016 | 2.2 | 30323 | 689 |  | 269 | 21 | 10 | 10 | 0.5238 | 1.9091 | -642.0816 | 0 |  | 107.4808 | 56.2995 | 7 |
| K3LF | 69 | 2/9/2016 | 2.2 | 30323 | 689 |  | 269 | 21 | 10 | 10 | 0.5238 | 1.9091 | -642.0816 | 0 |  | 107.4808 | 56.2995 | 7 |
| K3LF | 69 | 2/1/2014 | 2.1 | 30323 | 689 |  | 269 | 23.5 | 10 | 10 | 0.4681 | 2.1364 | -1979.3948 | 0 |  | 100.1017 | 46.8561 | 7 |
| K3LF | 69 | 2/1/2011 | 2.1 | 30323 | 689 | 1081000 | 269 | 23.5 | 10 | 10 | 0.4681 | 2.1364 | -1979.3948 | 0 | 35.6495 | 100.1017 | 46.8561 | 7 |
| K3LF | 69 | 2/26/2015 | 2 | 30323 | 689 |  | 269 | 25 | 10 | 10 | 0.4400 | 2.2727 | -3675.8273 | 0 |  | 92.7226 | 40.7979 | 6 |
| K3LF | 69 | 1/12/2012 | 1.9 | 30323 | 689 |  | 269 | 27 | 10 | 10 | 0.4074 | 2.4545 | -7936.9944 | 0 |  | 85.3434 | 34.7696 | 6 |
| K3LF | 69 | 1/15/2007 | 1.9 | 30323 | 689 | 5000 | 269 | 27 | 10 | 10 | 0.4074 | 2.4545 | -7936.9944 | 0 | 0.1649 | 85.3434 | 34.7696 | 6 |
| K3LF | 69 | 12/19/2008 | 1.9 | 30323 | 689 | 30000 | 269 | 27 | 10 | 10 | 0.4074 | 2.4545 | -7936.9944 | 0 | 0.9893 | 85.3434 | 34.7696 | 6 |
| K3LF | 69 | 2/6/2010 | 1.8 | 30323 | 689 |  | 269 | 30 | 10 | 10 | 0.3667 | 2.7273 | -22764.9457 | 0 |  | 77.9643 | 28.5869 | 6 |
| K3LF | 69 | 3/29/2009 | 1.8 | 30323 | 689 |  | 269 | 30 | 10 | 10 | 0.3667 | 2.7273 | -22764.9457 | 0 |  | 77.9643 | 28.5869 | 6 |
| K3LF | 69 | 2/28/2015 | 1.8 | 30323 | 689 |  | 269 | 30 | 10 | 10 | 0.3667 | 2.7273 | -22764.9457 | 0 |  | 77.9643 | 28.5869 | 6 |
| K3LF | 69 | 12/15/2008 | 1.7 | 30323 | 689 |  | 269 | 32.5 | 10 | 10 | 0.3385 | 2.9545 | -50687.1870 | 0 |  | 70.5852 | 23.8904 | 6 |
| K3LF | 69 | 2/9/2010 | 1.7 | 30323 | 689 |  | 269 | 32.5 | 10 | 10 | 0.3385 | 2.9545 | -50687.1870 | 0 |  | 70.5852 | 23.8904 | 6 |
| K3LF | 69 | 11/22/2007 | 1.6 | 30323 | 689 |  | 269 | 34.5 | 10 | 10 | 0.3188 | 3.1364 | -92099.9477 | 0 |  | 63.2061 | 20.1527 | 6 |
| K3LF | 69 | 1/5/2014 | 1.6 | 30323 | 689 |  | 269 | 34.5 | 10 | 10 | 0.3188 | 3.1364 | -92099.9477 | 0 |  | 63.2061 | 20.1527 | 6 |
| K3LF | 69 | 2/22/2008 | 1.5 | 30323 | 689 |  | 269 | 36 | 10 | 10 | 0.3056 | 3.2727 | -140959.7352 | 0 |  | 55.8270 | 17.0582 | 5 |
| K3LF | 69 | 12/29/2009 | 1.4 | 30323 | 689 |  | 269 | 42 | 10 | 10 | 0.2619 | 3.8182 | -658514.5768 | 0 |  | 48.4478 | 12.6887 | 4 |
| K3LF | 69 | 2/22/2010 | 1.4 | 30323 | 689 |  | 269 | 42 | 10 | 10 | 0.2619 | 3.8182 | -658514.5768 | 0 |  | 48.4478 | 12.6887 | 4 |
| K3LF | 69 | 11/24/2010 | 1.4 | 30323 | 689 |  | 269 | 42 | 10 | 10 | 0.2619 | 3.8182 | -658514.5768 | 0 |  | 48.4478 | 12.6887 | 4 |
| K3LF | 69 | 2/10/2016 | 1.4 | 30323 | 689 |  | 269 | 42 | 10 | 10 | 0.2619 | 3.8182 | -658514.5768 | 0 |  | 48.4478 | 12.6887 | 4 |
| K3LF | 69 | 11/30/2006 | 1.4 | 30323 | 689 |  | 269 | 42 | 10 | 10 | 0.2619 | 3.8182 | -658514.5768 | 0 |  | 48.4478 | 12.6887 | 4 |
| K3LF | 69 | 1/20/2011 | 1.4 | 30323 | 689 |  | 269 | 42 | 10 | 10 | 0.2619 | 3.8182 | -658514.5768 | 0 |  | 48.4478 | 12.6887 | 4 |
| K3LF | 69 | 1/31/2011 | 1.4 | 30323 | 689 |  | 269 | 42 | 10 | 10 | 0.2619 | 3.8182 | -658514.5768 | 0 |  | 48.4478 | 12.6887 | 4 |
| K3LF | 69 | 2/17/2014 | 1.4 | 30323 | 689 |  | 269 | 42 | 10 | 10 | 0.2619 | 3.8182 | -658514.5768 | 0 |  | 48.4478 | 12.6887 | 4 |
| K3LF | 69 | 2/5/2010 | 1.4 | 30323 | 689 | 5000 | 269 | 42 | 10 | 10 | 0.2619 | 3.8182 | -658514.5768 | 0 | 0.1649 | 48.4478 | 12.6887 | 4 |
| K3LF | 69 | 2/2/2011 | 1.4 | 30323 | 689 | 15000 | 269 | 42 | 10 | 10 | 0.2619 | 3.8182 | -658514.5768 | 0 | 0.4947 | 48.4478 | 12.6887 | 4 |
| K3LF | 69 | 2/14/2007 | 1.4 | 30323 | 689 | 200000 | 269 | 42 | 10 | 10 | 0.2619 | 3.8182 | -658514.5768 | 0 | 6.5957 | 48.4478 | 12.6887 | 4 |
| K3LF | 69 | 3/5/2008 | 1.3 | 30323 | 689 |  | 269 | 50 | 10 | 10 | 0.2200 | 4.5455 | -3765070.1858 | 0 |  | 41.0687 | 9.0351 | 4 |
| K3LF | 69 | 12/12/2010 | 1.3 | 30323 | 689 |  | 269 | 50 | 10 | 10 | 0.2200 | 4.5455 | -3765070.1858 | 0 |  | 41.0687 | 9.0351 | 4 |
| ... | ... | ... | ... | ... | ... | ... | ... | ... | ... | ... | ... | ... | ... | ... | ... | ... | ... | ... |

FIG. 5

METHOD AND SYSTEM FOR PREDICTING THE FINANCIAL IMPACT OF FORECASTED WEATHER CONDITIONS

CROSS REFERENCE TO RELATED APPLICATIONS

This application claims priority to U.S. Provisional Patent Application No. 62/343,547, filed May 31, 2016, the entire contents of which is hereby incorporated by reference.

BACKGROUND

Predicting the impact of future weather, environmental, and/or geologic events is vital to companies and governmental organizations. However, the impact of those events is not simply dependent on the magnitude of those events. While heavy winds in Seattle, Wash., for example, may cause significant damage and disruption, winds of that magnitude may not have as much of an impact in Wichita, Kans., which has a history of strong winds (and an infrastructure and population that can withstand and adapt to those conditions). Accordingly, the impact of forecasted events may be predicted as a function of the impact of similar events in that location and the return frequency of those events in that location.

To date, the impact of future weather, environmental, and geologic events has been performed by humans making subjective determinations (e.g., meteorologists, environmental scientists, geologists, etc.). Those subjective determinations, however, have a number of drawbacks. In addition to the increased time it takes for a person (or a group of people) to make those subjective determinations, those subjective determinations are also inconsistent because they are dependent on the skill level and dispositions of the person (or people) making those determinations. As such, there is a need for a system that uses specific mathematical rules to predict the impact of forecasted weather, environmental, and geologic events.

SUMMARY

In order to overcome the disadvantages in the prior art, there is provided a system that uses specific mathematical rules to predict the impact of forecasted weather, environmental, and/or geologic events. Accordingly, there is provided a system and method for predicting the impact of forecasted weather, environmental, and geologic events (that include one or more weather/environmental/geologic conditions) by determining a recurrence interval of each past condition in each location, determining the correlation between the past condition and the observable impact of the past event, calculating a predicted observable impact of each past event, calculating a predicted impact of each past event recurring by multiplying the predicted observable impact of the past event by the recurrence interval of the past condition, grouping the past events into a plurality of groups based on the predicted impact of the past condition recurring, determining a threshold for each group, receiving forecasted conditions, and determining the predicted impact of the forecasted conditions by comparing the forecasted conditions with the thresholds.

BRIEF DESCRIPTION OF THE DRAWINGS

Aspects of exemplary embodiments may be better understood with reference to the accompanying drawings. The components in the drawings are not necessarily to scale, emphasis instead being placed upon illustrating the principles of exemplary embodiments, wherein:

FIG. 4 is a table of weather events in a location that have been ranked and grouped according to an exemplary embodiment of the present invention;

FIG. 5 is a table of weather events in another location that have been ranked and grouped according to an exemplary embodiment of the present invention;

DETAILED DESCRIPTION

Figure 1:
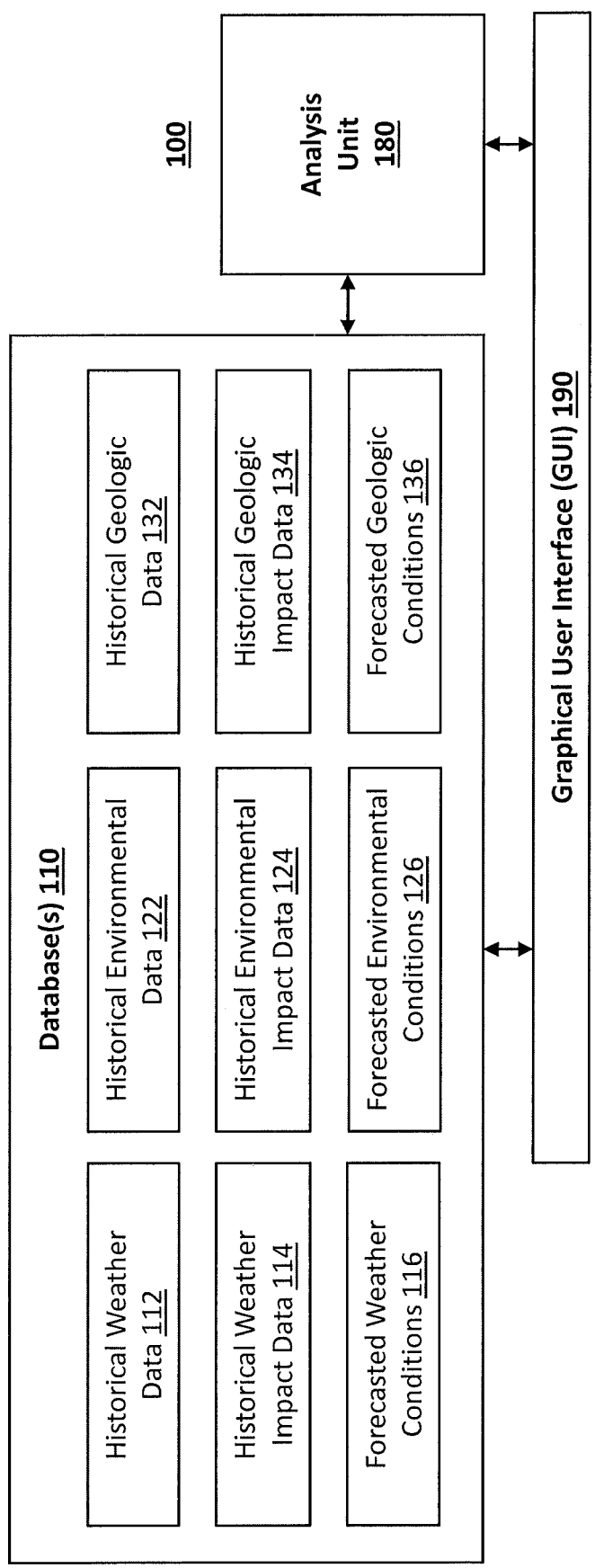
FIG. 1 is a block diagram illustrating a peril index analytics system according to an exemplary embodiment of the present invention.

Reference to the drawings illustrating various views of exemplary embodiments of the present invention is now made. In the drawings and the description of the drawings herein, certain terminology is used for convenience only and is not to be taken as limiting the embodiments of the present invention. Furthermore, in the drawings and the description below, like numerals indicate like elements throughout.

FIG. 1 is a block diagram illustrating a peril index analytics system 100 according to an exemplary embodiment of the present invention.

As shown in FIG. 1, the peril index analytics system 100 includes one or more databases 110, an analysis unit 180, and a graphical user interface 190. The one or more databases 110 include historical weather data 112, historical weather impact data 114, and forecasted weather conditions 116. While most of the embodiments are described below with reference to predicting the effects of forecasted weather conditions, in some embodiments the peril index analytics system 100 may be used to predict the effects of forecasted environmental conditions. Accordingly, the one or more databases 110 may also include historical environmental data 122, historical environmental impact data 124, and forecasted environmental conditions 126. In other embodiments the peril index analytics system 100 may be used to predict the effects of forecasted geologic conditions. Accordingly, the one or more databases 110 may also include historical geologic data 132, historical geologic impact data 134, and forecasted geologic conditions 136

The historical weather data 112 includes information indicative of the location, time, and severity of past weather events. Past weather events may include, for example, hurricanes, tornadoes, thunderstorms, hail, floods, lightning, high winds, snow, floods, droughts, temperature extremes, etc. Each weather event includes one or more weather conditions (e.g., snow, rain, ice, wind, heat, cold, etc.). The severity of each past weather event may be measured in terms of the snowfall accumulation, rainfall accumulation, ice accumulation, wind speed, high temperature, low temperature, etc. The historical weather data 112 may be received from publicly-available sources (e.g., the National Oceanic and Atmospheric Administration (NOAA) Storm Events Database), private sources (e.g., AccuWeather, Inc., AccuWeather Enterprise Solutions, Inc.), etc.

The historical weather impact data 114 includes information indicative of the damage and disruption associated with past weather events. The damage and disruption associated with past weather events may include direct damage to property and crops as well as indirect disruption attributable to the past weather events (e.g., power outages, lost sales, shipment delays data, reduced consumer spending, reduced visits to retail and service locations, augmented traffic speeds, etc.). The historical weather impact data 114 may be received from publicly-available sources (e.g., the NOAA Storm Events Database, which aggregates information from county, state and federal emergency management officials, local law enforcement officials, skywarn spotters, National Weather Service (NWS) damage surveys, newspaper clipping services, the insurance industry, the general public, etc.), information from industry-specific commercial and non-commercial entities (e.g., insurance claim information), third party sources, etc. The historical weather impact data 114 may also include client-specific data (received from a client) that is used by the peril index analytics system 100 to determine client-specific impacts of past weather events and predict the client-specific impact of forecasted weather conditions 116.

The forecasted weather conditions 116 include information indicative of the predicted location, predicted time, and predicted magnitude of forecasted weather conditions (e.g., snow, rain, ice, wind, heat, cold, etc.) and events (e.g., hurricanes, tornadoes, thunderstorms, hail, lightning, high winds, snow, floods, droughts, temperature extremes, etc.) The forecasted weather conditions and events may be received from AccuWeather, Inc., AccuWeather Enterprise Solutions, Inc., the National Weather Service (NWS), the National Hurricane Center (NHC), other governmental agencies (such as Environment Canada, the U.K. Meteorologic Service, the Japan Meteorological Agency, etc.), private companies (such as Vaisalia's U.S. National Lightning Detection Network, Weather Decision Technologies, Inc.), individuals (such as members of the Spotter Network), etc.

The historical environmental data 122 includes information indicative of the location, time, and severity of past environmental events and environmental conditions (e.g., pollution, deforestation, depopulation, climate change, meteorological conditions, inhospitableness, biodegradable pollution, nonbiodegradable pollution, air pollution, noise pollution, sound pollution, thermal pollution, water pollution, etc.). The historical environmental data 122 may be received from publicly-available sources (e.g., NOAA, the U.S. Geologic Survey, etc.), private sources, etc.

The historical environmental impact data 124 includes information indicative of the damage and disruption associated with past environmental events. The damage and disruption associated with past environmental events may include direct damage to property and crops as well as indirect disruption attributable to the past environmental events (e.g., power outages, lost sales, shipment delays data, reduced consumer spending, reduced visits to retail and service locations, augmented traffic speeds, etc.). The historical environmental impact data 124 may also include client-specific data (received from a client) that is used by the peril index analytics system 100 to determine client-specific impacts of past environmental events and predict client-specific impact of forecasted environmental conditions 126.

The forecasted environmental conditions 126 include information indicative of the predicted location, predicted time, and predicted severity of forecasted environmental events and forecasted environmental condition (e.g., pollution, deforestation, depopulation, climate change, meteorological conditions, inhospitableness, biodegradable pollution, nonbiodegradable pollution, air pollution, noise pollution, sound pollution, thermal pollution, water pollution, etc.). The forecasted environmental conditions may be received from AccuWeather, Inc., AccuWeather Enterprise Solutions, Inc., the National Weather Service (NWS) the U.S. Geologic Survey, other governmental agencies, private companies, etc.

The historical geologic data 132 includes information indicative of the location, time, and severity of past geologic events and geologic conditions (e.g., erosion, glaciation, volcanic eruption or emission, earthquakes, tsunamis, avalanches, landslides, mudslides, etc.). The historical geologic data 132 may be received from publicly-available sources (e.g., NOAA, the U.S. Geologic Survey, etc.), private sources, etc.

The historical geologic impact data 134 includes information indicative of the damage and disruption associated with past geologic events. The damage and disruption associated with past geologic events may include direct damage to property and crops as well as indirect disruption attributable to the past geologic events (e.g., power outages, lost sales, shipment delays data, reduced consumer spending, reduced visits to retail and service locations, augmented traffic speeds, etc.). The historical geologic impact data 134 may also include client-specific data (received from a client) that is used by the peril index analytics system 100 to determine client-specific impacts of past geologic events and predict client-specific impact of forecasted geologic conditions 136.

The forecasted geologic conditions 136 include information indicative of the predicted location, predicted time, and predicted severity of forecasted geologic events and forecasted geologic condition (e.g., erosion, glaciation, volcanic eruption or emission, earthquakes, tsunamis, avalanches, landslides, mudslides, etc.). The forecasted geologic conditions may be received from AccuWeather, Inc., Accu- Weather Enterprise Solutions, Inc., the National Weather Service (NWS) the U.S. Geologic Survey, other governmental agencies, private companies, etc.

Figure 2:
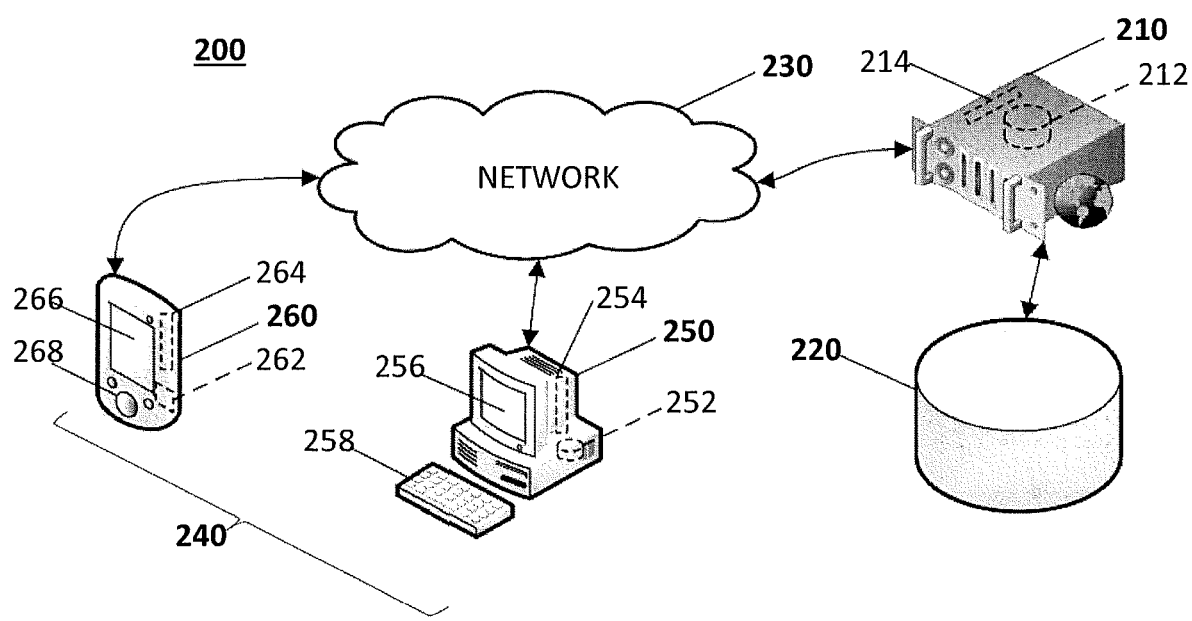
FIG. 2 is a block diagram illustrating an overview of the architecture of the peril index analytics system according to an exemplary embodiment of the present invention.

FIG. 2 is a drawing illustrating an overview of the architecture 200 of the peril index analytics system 100 according to an exemplary embodiment of the present invention.

As shown in FIG. 2, the architecture 200 may include one or more servers 210 and one or more storage devices 220 connected to a plurality of remote computer systems 240, such as one or more personal systems 250 and one or more mobile computer systems 260, via one or more networks 230.

The one or more servers 210 may include an internal storage device 212 and a processor 214. The one or more servers 210 may be any suitable computing device including, for example, an application server and a web server which hosts websites accessible by the remote computer systems 240. The one or more storage devices 220 may include external storage devices and/or the internal storage device 212 of the one or more servers 210. The one or more storage devices 220 may also include any non-transitory computer-readable storage medium, such as an external hard disk array or solid-state memory. The networks 230 may include any combination of the internet, cellular networks, wide area networks (WAN), local area networks (LAN), etc. Communication via the networks 230 may be realized by wired and/or wireless connections. A remote computer system 240 may be any suitable electronic device configured to send and/or receive data via the networks 230. A remote computer system 240 may be, for example, a network-connected computing device such as a personal computer, a notebook computer, a smartphone, a personal digital assistant (PDA), a tablet, a notebook computer, a portable weather detector, a global positioning satellite (GPS) receiver, network-connected vehicle, a wearable device, etc. A personal computer system 250 may include an internal storage device 252, a processor 254, output devices 256 and input devices 258. The one or more mobile computer systems 260 may include an internal storage device 262, a processor 264, output devices 266 and input devices 268. An internal storage device 212, 252, and/or 262 may include one or more non-transitory computer-readable storage mediums, such as hard disks or solid-state memory, for storing software instructions that, when executed by a processor 214, 254, or 264, carry out relevant portions of the features described herein. A processor 214, 254, and/or 264 may include a central processing unit (CPU), a graphics processing unit (GPU), etc. A processor 214, 254, and 264 may be realized as a single semiconductor chip or more than one chip. An output device 256 and/or 266 may include a display, speakers, external ports, etc. A display may be any suitable device configured to output visible light, such as a liquid crystal display (LCD), a light emitting polymer display (LPD), a light emitting diode display (LED), an organic light emitting diode display (OLED), etc. The input devices 258 and/or 268 may include keyboards, mice, trackballs, still or video cameras, touchpads, etc. A touchpad may be overlaid or integrated with a display to form a touch-sensitive display or touchscreen.

Referring back to FIG. 1, the one or more databases 110 may be any organized collection of information, whether stored on a single tangible device or multiple tangible devices, and may be stored, for example, in the one or more storage devices 220. The analysis unit 180 may be realized by software instructions stored on one or more of the internal storage devices 212, 252, and/or 262 and executed by one or more of the processors 214, 254, or 264. The graphical user interface 190 may be any interface that allows a user to input information for transmittal to the peril index analytics system 100 and/or outputs information received from the peril index analytics system 100 to a user. The graphical user interface 190 may be realized by software instructions stored on one or more of the internal storage devices 212, 252, and/or 262 and executed by one or more of the processors 214, 254, or 264.

Figure 3:
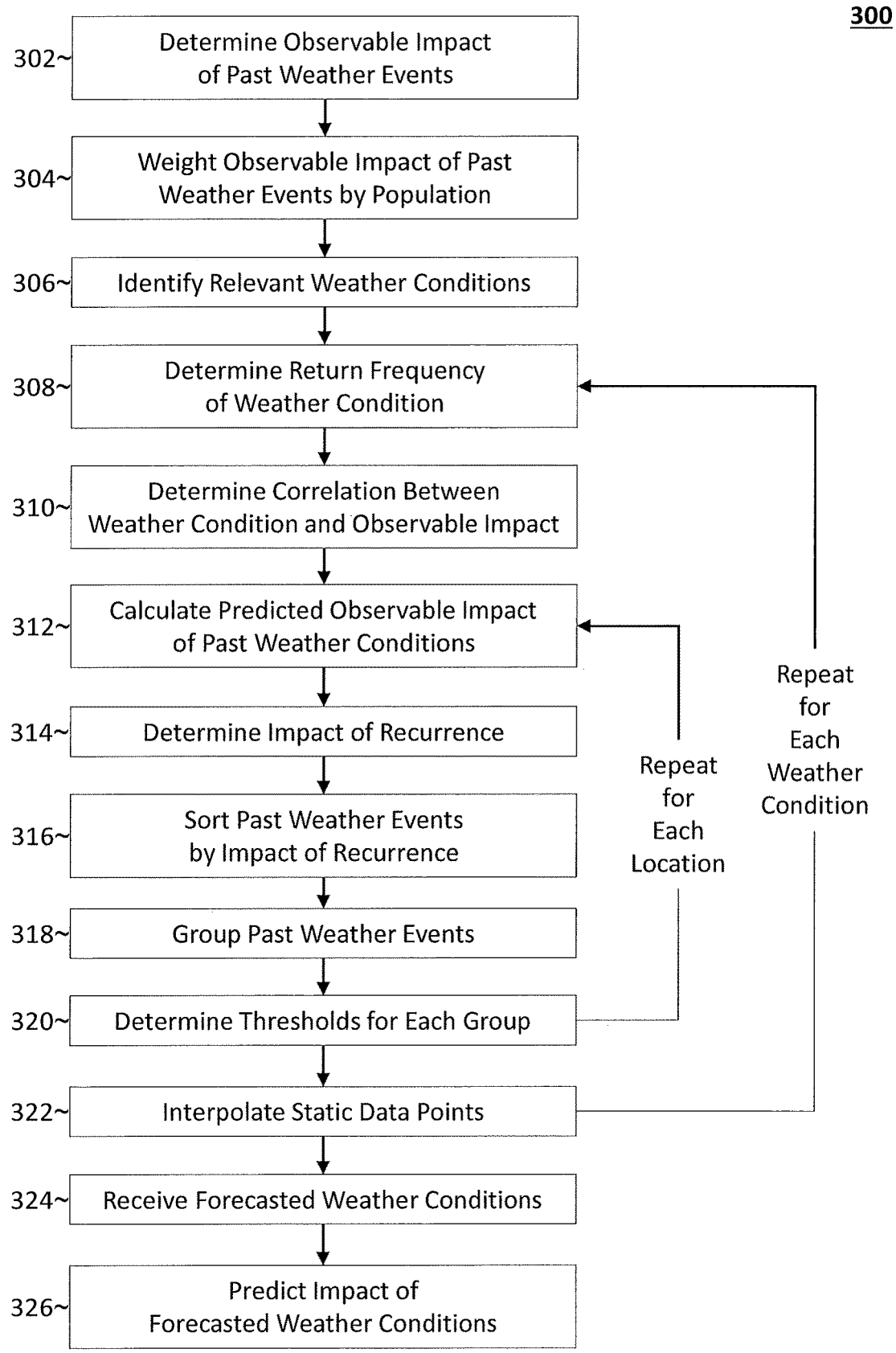
FIG. 3 is a flow chart of a process for predicting the impact of forecasted weather conditions according to exemplary embodiments of the present invention.

FIG. 3 is a flow chart of a process 300 for predicting the impact of forecasted weather conditions. The process 300 may be performed, for example, by the analysis unit 180.

The observable impact of at least some of the past weather events is determined in step 302. As described above, the historical weather impact data 114 includes information indicative of the damage and disruption associated with past weather events. In the simplest embodiment, the impact of a past weather event is the cost of physical damage (measured, for example, in dollars) caused by those weather events (as aggregated, for example, by the NOAA Storm Events Database). In other embodiments, the total observable impact of a past weather event is determined by adding the cost of physical damage caused that weather event and the estimated cost (measured in dollars, man-hours, etc.) of indirect disruption associated with that weather event (e.g., power outages, lost sales, lost productivity, reduced consumer spending, reduced visits to retail and service locations, augmented traffic speeds, shipment delays, etc.) to determine an objective estimate of the total observable impact of that weather event. Finally, in other embodiments, the peril index analytics system 100 may be used to predict a specific impact of forecasted weather events. In those embodiments, the impact of a weather event is the cost of that specific observable impact.

The impact of individual weather events is determined by spatially joining the damage and disruption information included in the historical weather impact data 114 and the weather event information included in the historical weather data 112 (e.g., merging the observable damage and disruption information and the weather condition information by location and date).

FIG. 4 is an exemplary table of weather events (in this example, events that include snow) in a location (in this example, Alamosa, Colo.) with analysis performed accordingly to an exemplary embodiment of the present invention. As shown in FIG. 4, some of the weather events include an objective estimate of the observable impact ("IMPACT") of the weather event.

FIG. 5 is an exemplary table of weather events (in this example, events that include snow) in another location (in this example, Litchfield, Ill.) with analysis performed accordingly to an exemplary embodiment of the present invention. As shown in FIG. 4, some of the weather events include an objective estimate of the observable impact ("IMPACT") of the weather event.

As described in detail below, each row includes information regarding a weather event, where:
"METAR" is the location as identified by the Meteorological Terminal Aviation Routine Weather Report (METAR) station;
NMETAR is the numeric designation of the METAR station;
DATE is the date of the weather event;
SNOWFALL is the total daily snowfall in inches;
POPULATION is the estimated 2012 population;
ELEVATION is the elevation above sea-level (in meters);

IMPACT is the total observable impact from the sum of the reports near the METAR station included in the historical weather event impact data 114;

SNOW_EVENTS is the total number of days of snowfall in the dataset;

MAGNITUDE is the ranking of the weather event, when sorted by total daily snowfall ("SNOWFALL");

N is the number of years in the dataset;

R is the number of years for a snowfall event to be exceeded at least once for probability calculation;

T is (N+1)/MAGNITUDE, which is known as "a recurrence interval";

P is 1/T, which is the probability of an event with the recurrence interval, T;

PE is 1−(P**R), also known as "the probability of exceedance," described as the risk of failure (for example, 10 year snowfalls have a 10% chance of occurrence in any given year, or PE=0.10);

W_IMPACT is IMPACT/POPULATION (the weighted observable impact);

P_IMPACT is the predicted observable impact as determined, for example, by the regression algorithm determined in step 310;

IMPACT_VALUE is T*P_IMPACT;

IMPACT_INDICATOR is the result of a series of IF statements fitting the distribution of the data into 10 categories scaled from 1 to 10, where 10 is the highest IMPACT_VALUE and 1 is the lowest IMPACT_VALUE.

Referring back to FIG. 3, the observable impact of each of the past weather events are weighted by population in step 304 to account for the fact that weather events in less populated areas would have more impact in more populated areas. As shown in the examples in FIGS. 4 and 5, the weighted observable impact W_IMPACT is IMPACT/POPULATION.

Each weather event includes one or more relevant weather conditions. A winter storm, for example, may include both snowfall (measured, for example, in inches) and low temperatures (measured, for example, in degrees Fahrenheit). The historical weather data 112 includes information indicative those past weather conditions. For each of the past weather events, the peril index analytics system 100 determines one or more relevant weather conditions (e.g., snow, rain, ice, wind, temperature, etc.) in step 306.

The likelihood of each of the past weather conditions reoccurring at that magnitude, known statistically as a return frequency, is determined in step 308. As shown in the examples in FIGS. 4 and 5:

N is the number of years in the dataset;

R is the number of years for a snowfall event to be exceeded at least once for probability calculation;

T is (N+1)/MAGNITUDE, which is known as "a recurrence interval";

P is 1/T, which is the probability of an event with the recurrence interval, T; and PE is 1−(P**R), also known as "the probability of exceedance," described as the risk of failure (for example, 10 year snowfalls have a 10% chance of occurrence in any given year, or PE=0.10).

For each of the relevant weather conditions, correlations are determined between those the past weather conditions (as well as other explanatory variables) and the observable impact of those past weather conditions in step 310. For example, the peril index analytics system 100 may use a regression algorithm for W_IMPACT (dependent variable) using multiple regressors (independent variables) following the equation $$Y = \beta_0 + \beta_1 X_1 + \beta_2 X_2 + \ldots + \beta_k X_k, \text{ where}$$

$X_k$ are k number of predictor variables; and $\beta_k$ are regression coefficients.

An initial regression model for snowfall, for example, may determine that $$P\_IMPACT = \beta_0 + \beta_1 SNOWFALL$$

In order to determine the additional predictor variables ($X_2$, etc.) for snowfall, residuals from the initial regression model may be plotted in ArcGIS and, using a cluster analysis, locations may be grouped into different regional groups. The regression algorithm would then be performed on a number of groups with each group having a unique coefficient $\beta_k$ for each potential predictor variable $X_k$. The addition predictor variables may be PE (probability of exceedance), elevation, household size, demographic information, seasonality metrics, etc.

Accordingly, for each location of a past weather event, the peril index analytics system 100 determines formulas to predict the observable impact of each weather condition (e.g., snow, rain, ice, wind, temperature, etc.), and additional features of that location. Notably, the coefficients ($\beta_0$, $\beta_1, \ldots \beta_k$) and the additional predictor variables ($X_2, \ldots X_k$) are separately determined for each weather condition and location.

For each location of a past weather event, the peril index analytics system 100 calculates the predicted observable impact of each of the past weather conditions in step 312. As shown in the examples in FIGS. 4 and 5, the predicted observable impact (P_IMPACT) is calculated based on the SNOWFALL amount and other predictor variables using the formula determined by the regression algorithm in step 310.

The peril index analytics system 100 is used to predict the impact of future weather conditions, which is a function of both the observable impact stored in the historical weather impact data 114 and how often that location experiences those forecasted weather conditions. In other words, a weather event that occurs less often in a particular location will likely have more impact in that location than if those same weather conditions were a frequent occurrence in that location.

Accordingly, the predicted impact of the past weather conditions recurring is determined in step 314. As shown in the examples in FIGS. 4 and 5, predicted impact of the past weather events recurring (IMPACT_VALUE) is the recurrence interval (T) multiplied by the predicted observable impact (P_IMPACT).

For each location of a past weather event, the past weather events are sorted by the predicted impact of the past weather events recurring in step 316. As shown in the examples in FIGS. 4 and 5, the past weather events are sorted by the predicted impact of the past weather events recurring (IMPACT_VALUE).

For each location of a past weather event, the past weather events are grouped based on the predicted impact of the past weather events recurring (IMPACT_VALUE) in step 318. The past weather events are sorted into groups. For example, the Jenks optimization method may be used to assign each of the past weather events to a number of groups (e.g., 10 groups) based on the predicted impact of the past weather events recurring (IMPACT_VALUE). Using the Jenks optimization method, also called the Jenks natural breaks classification method, places each of the weather events into one of the groups so as to minimize each group's average deviation from the group's mean, while maximizing each group's deviation from the means of the other groups. In other words, the method seeks to reduce the variance within groups and maximize the variance between groups. As shown in the example in FIG. 4, the five weather events with the highest IMPACT VALUE are placed in IMPACT_INDICATOR group 10, the weather event with the next highest IMPACT VALUE is placed in IMPACT_INDICATOR group 9, etc.

For each location of a past weather event, thresholds are determined for each group in step 320. In one embodiment, the threshold for each group may be the minimum amount of the weather condition in that group. Using the example in FIG. 4, the peril index system 100 may determine that the threshold for group 10 is a weather event equal to 7.0 inches of snowfall (i.e., the lowest amount of snowfall in group 10). In another embodiment, the threshold for each group may be the minimum amount of the weather condition in the group below. Using the example in FIG. 4, the threshold for group 10 would be 6.7 inches of snowfall (i.e., the highest amount of snowfall in group 9). In this embodiment, the threshold for group 1 would be 0. In other embodiments, the threshold for each group may be between the minimum amount of the weather condition in that group and the maximum amount of the weather condition in the group below. Using the example in FIG. 4, the threshold for group 10 would be between 7.0 inches and 6.7 inches of snowfall.

Steps 312 through 320 are performed for each weather condition in each location of a past weather event. Accordingly, the peril index analytics system 100 determines a number of thresholds (e.g., 10 thresholds) for each of a plurality of weather conditions (e.g., snow, rain, ice, wind, heat, cold) in each location of a past weather event.

The thresholds for the locations of the past weather events may be interpolated for additional geographic locations in step 322. As described above with reference to step 302, each past weather event and the impact of each past weather event may be spatially joined based on proximity to a number of discrete locations (e.g., the locations of METAR stations). In order to determine thresholds for additional geographic locations, the peril index analytics system 100 may use a Kriging technique to interpolate the thresholds into a smooth raster surface that includes thresholds for each geographic location in the entire coverage area of the peril index analytics system 100 (for example, the continental United States and lower provinces in Canada).

Forecasted weather conditions are received in step 324. The forecasted weather conditions may be for any time period, from an hourly forecast to a seasonal forecast or even a yearly forecast. Accordingly, the peril index analytics system 100 may be used to predict not only the impact of a particular weather event, but the impact of all weather events that are likely to impact each location over a long time period.

The predicted impact of the forecasted weather conditions is determined in step 326. The forecasted weather conditions in each location are compared to the thresholds for that location to determine the predicted impact of those weather conditions. Using the example illustrated in FIG. 4, if a forecast includes 10 inches of snowfall in Alamosa, Colo., then impact of that weather condition is classified as a 10 because the forecasted snowfall amount is greater than the threshold for group 10. The predicted impact of forecasted weather conditions is output via the GUI 190. The predicted impact of forecasted weather conditions may be output in a multitude of formats, including textural data, graphical images (GIS layers), etc. Other presentation formats, such as audio and video displays, may be utilized depending upon the specific use or application.

Figure 6:
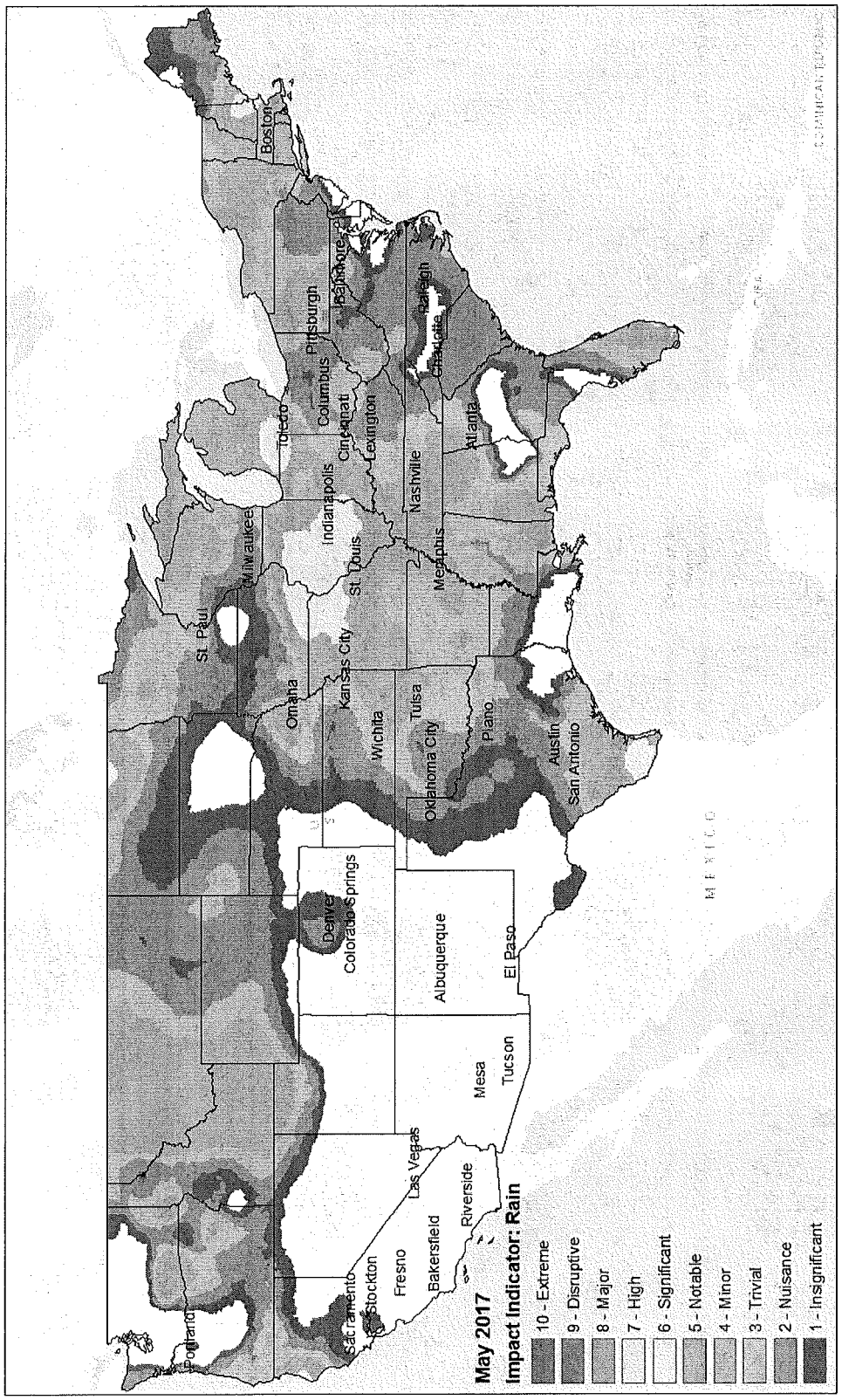
FIGS. 6-7 illustrate the predicted impact of forecasted weather conditions as determined and output in graphical format according to exemplary embodiments of the present invention.
Figure 7:
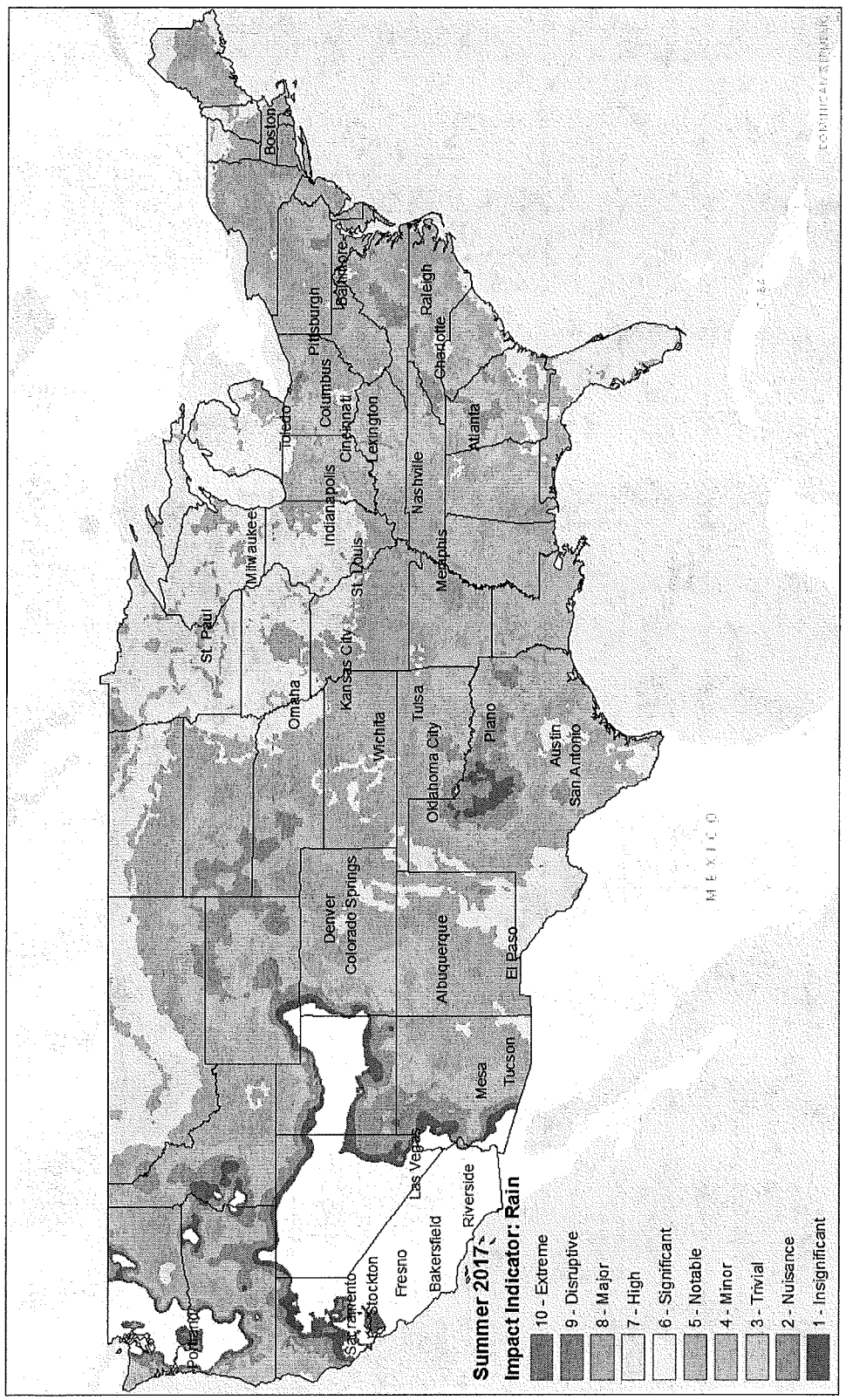

FIGS. 6-7 illustrates the predicted impact of a forecasted weather condition as determined and output in graphical format according to exemplary embodiments of the present invention.

As shown in FIG. 6, the forecasted weather condition is rain forecasted for during the time period of May 2017. The predicted impact of the forecasted rain in each location, which is determined by comparing the maximum forecasted rainfall amount during the time period to the thresholds (determined as described above) for rain in each of the locations of the forecasted rainfall, is superimposed on a map as shown. In the example shown in FIG. 6, there are 10 thresholds for 10 groups. Group 10 represents the highest predicted impact, which represents an amount of rain that rarely occurs in that location (high recurrence interval) and has a large predicted observable impact (based on the correlations described above). Group 1-9 represent lower predicted impacts, meaning amounts of rain that occur more often in that location and/or have a lower predicted observable impact.

As shown in FIG. 7, the forecasted weather condition is rain forecasted for during the time period of Summer 2017. The predicted impact of the forecasted rain in each location, which is determined by comparing the maximum forecasted rainfall amount during the time period to the thresholds (determined as described above) for rain in each of the locations of the forecasted rainfall. In the example shown in FIG. 7, there are 10 thresholds for 10 groups. Group 10 represents the highest predicted impact, which represents an amount of rain that rarely occurs in that location (high recurrence interval) and has a large predicted observable impact (based on the correlations described above). Group 1-9 represent lower predicted impacts, meaning amounts of rain that occur more often in that location and/or have a lower predicted observable impact.

Figure 8B:
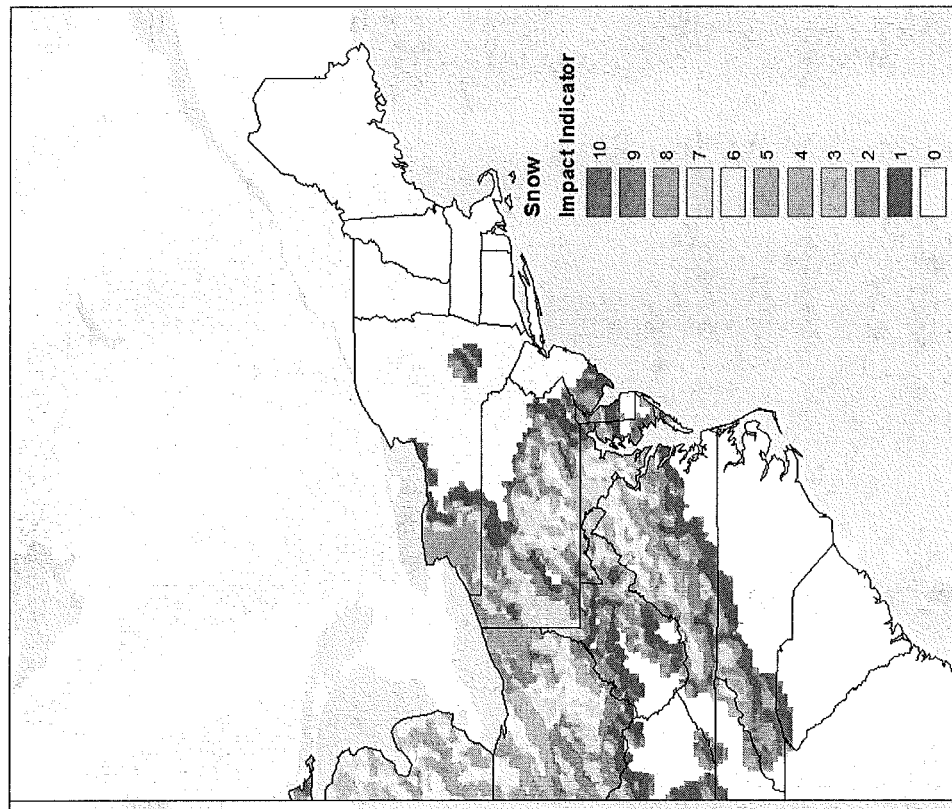
FIG. 8B illustrates the predicted impact of the forecasted weather conditions shown in FIG. 8A according to an exemplary embodiment of the present invention.
Figure 8A:
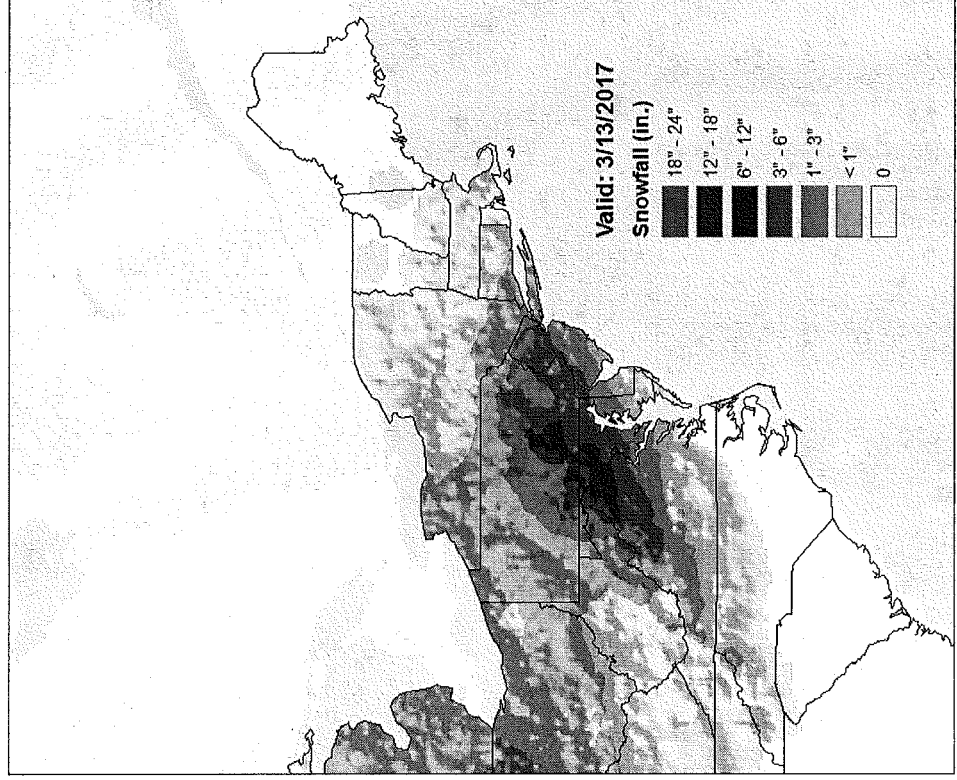
FIG. 8A shows an example of forecasted weather conditions.

FIG. 8A shows an example of forecasted weather conditions, specifically snowfall during the time period of Mar. 13, 2017. FIG. 8B illustrates the predicted impact of the forecasted weather conditions shown in FIG. 8A according to an exemplary embodiment of the present invention.

Figure 9B:
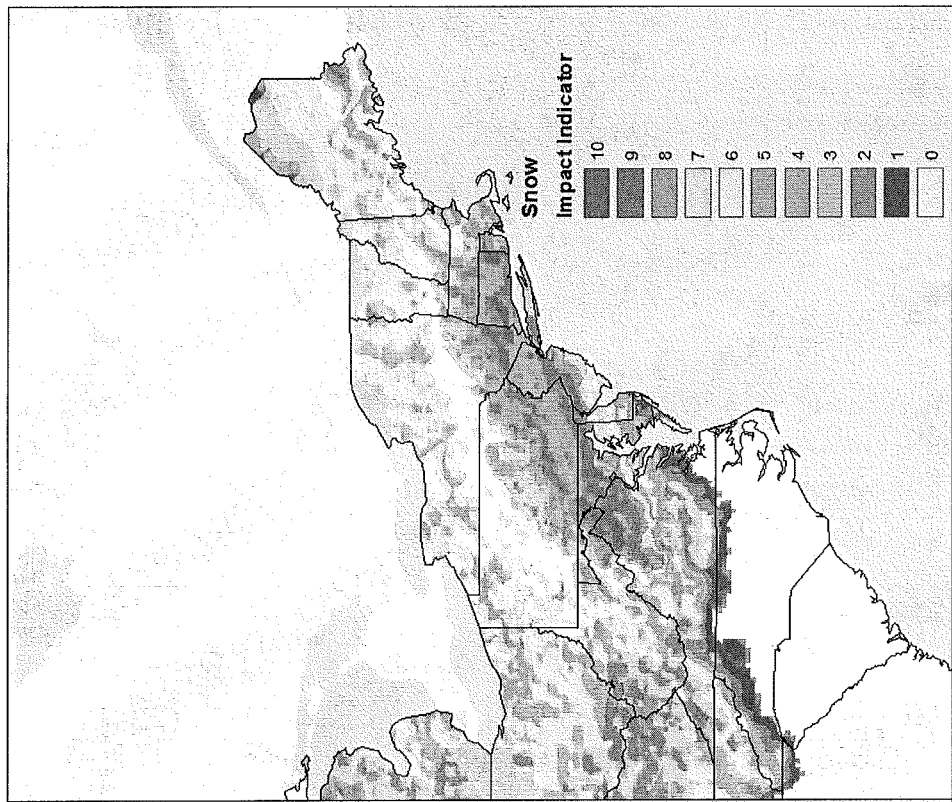
FIG. 9B illustrates the predicted impact of the forecasted weather conditions shown in FIG. 9A according to an exemplary embodiment of the present invention.
Figure 9A:
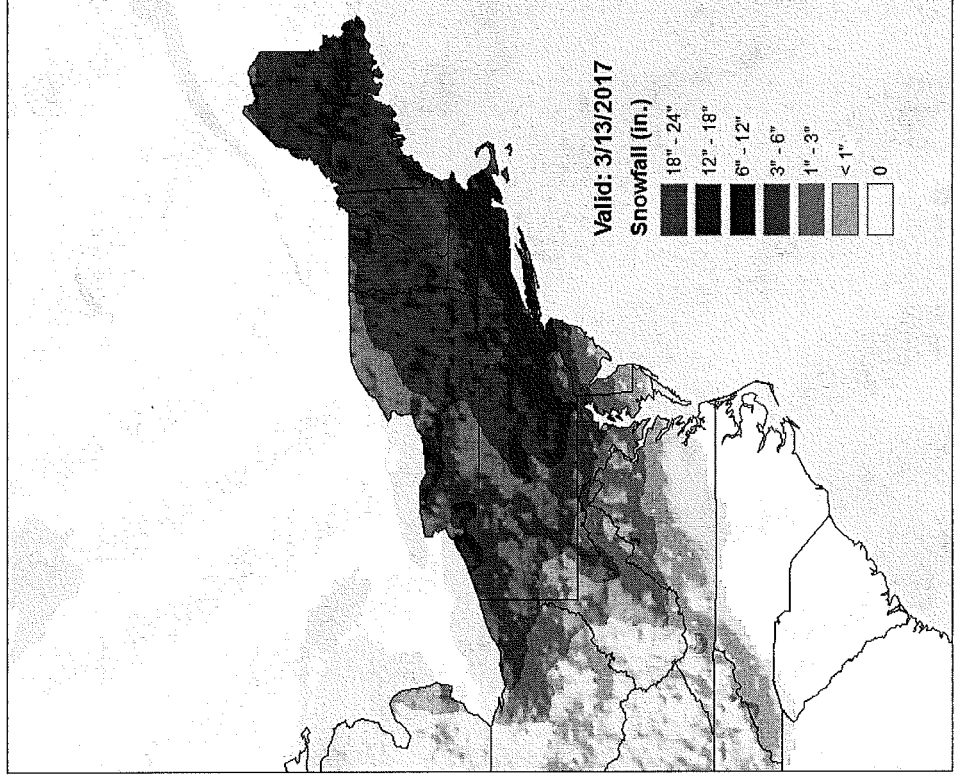
FIG. 9A shows another example of forecasted weather conditions.

FIG. 9A shows another example of forecasted weather conditions, again snowfall during the time period of Mar. 13, 2017. FIG. 9B illustrates the predicted impact of the forecasted weather conditions shown in FIG. 9A according to an exemplary embodiment of the present invention.

Figure 10B:
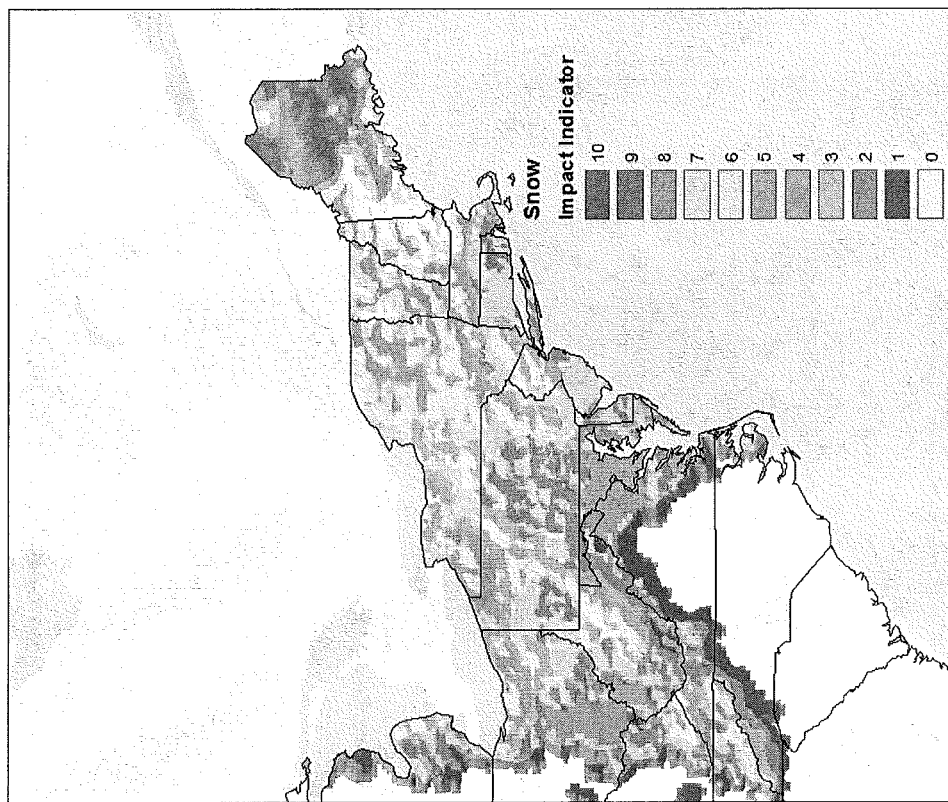
FIG. 10B illustrates the predicted impact of the forecasted weather conditions shown in FIG. 10A according to an exemplary embodiment of the present invention.
Figure 10A:
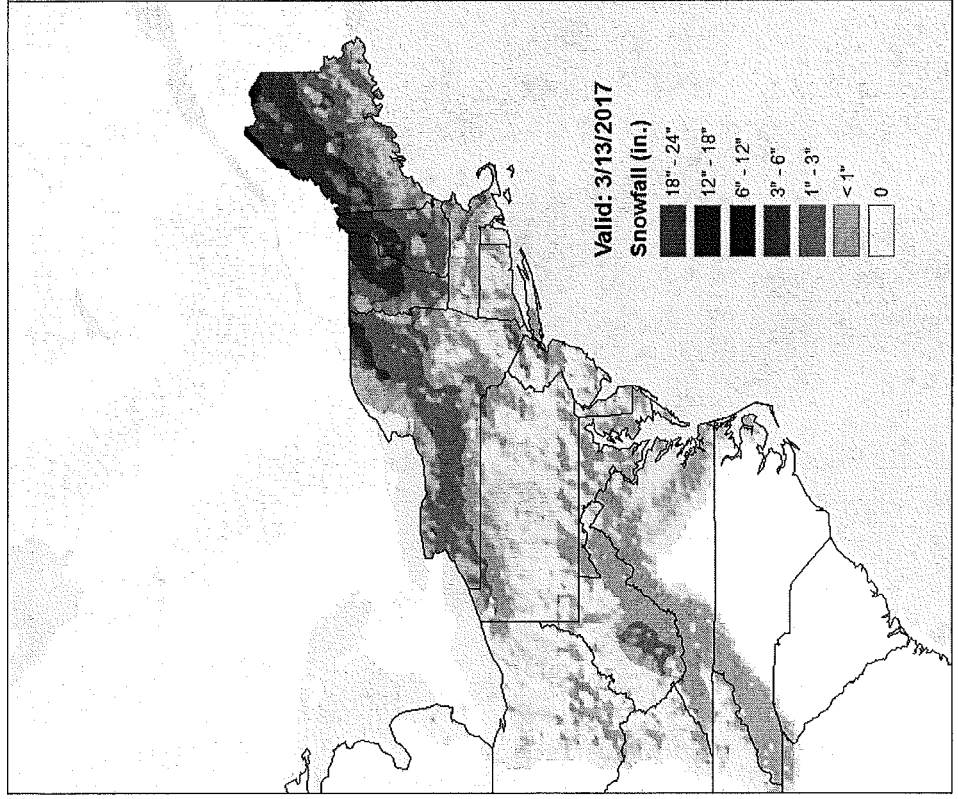
FIG. 10A shows another example of forecasted weather conditions.

FIG. 10A shows another example of a forecasted weather conditions, again snowfall during the time period of Mar. 13, 2017. FIG. 10B illustrates the predicted impact of the forecasted weather conditions shown in FIG. 10A according to an exemplary embodiment of the present invention.

Figures 11A, 11B:
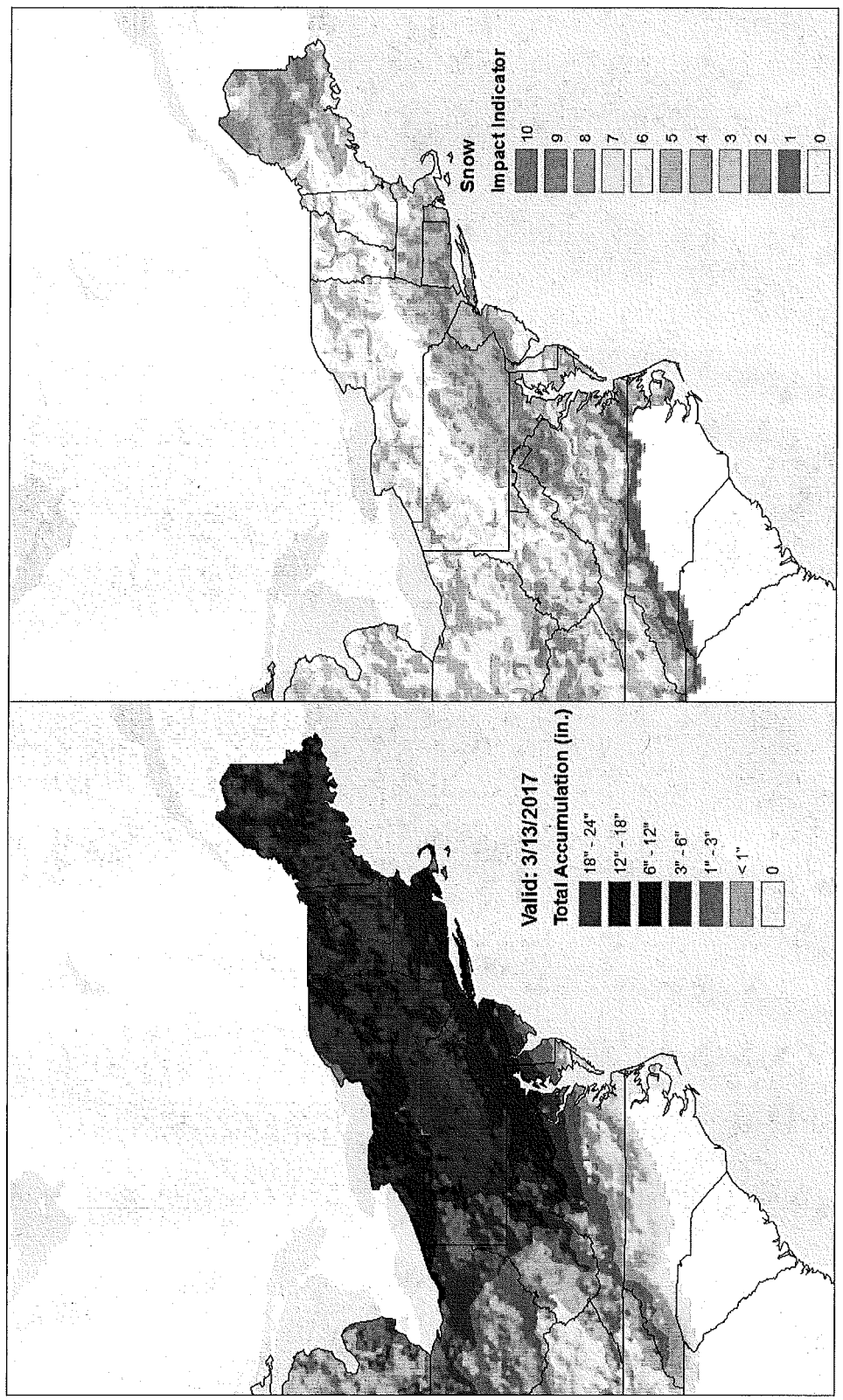
FIG. 11A shows another example of forecasted weather conditions.
FIG. 11B illustrates the predicted impact of the forecasted weather conditions shown in FIG. 11A according to an exemplary embodiment of the present invention.

FIG. 11A shows another example of a forecasted weather conditions, again snowfall during the time period of Mar. 13, 2017. FIG. 11B illustrates the predicted impact of the forecasted weather conditions shown in FIG. 11A according to an exemplary embodiment of the present invention.

As shown in FIGS. 8A-B, 9A-B, 10A-B, and 11A-B, the predicted impact of the forecasted weather conditions is related not only to the magnitude of those forecasted weather conditions, but also the characteristics of those particular locations, most notably the recurrence interval of those forecasted weather conditions at those magnitudes in those locations.

The peril index analytics system 100 may also be used to output alerts based on the impact of forecasted weather conditions (as opposed to merely the severity of those forecasted weather conditions). For example, the peril index analytics system 100 may also be used to output alert to a user if the impact of a forecasted weather condition is predicted to exceed one of the thresholds specified by the user. The alerts may be output via the graphical user interface 190, email, SMS, smartphone notification, etc.

Figure 12:
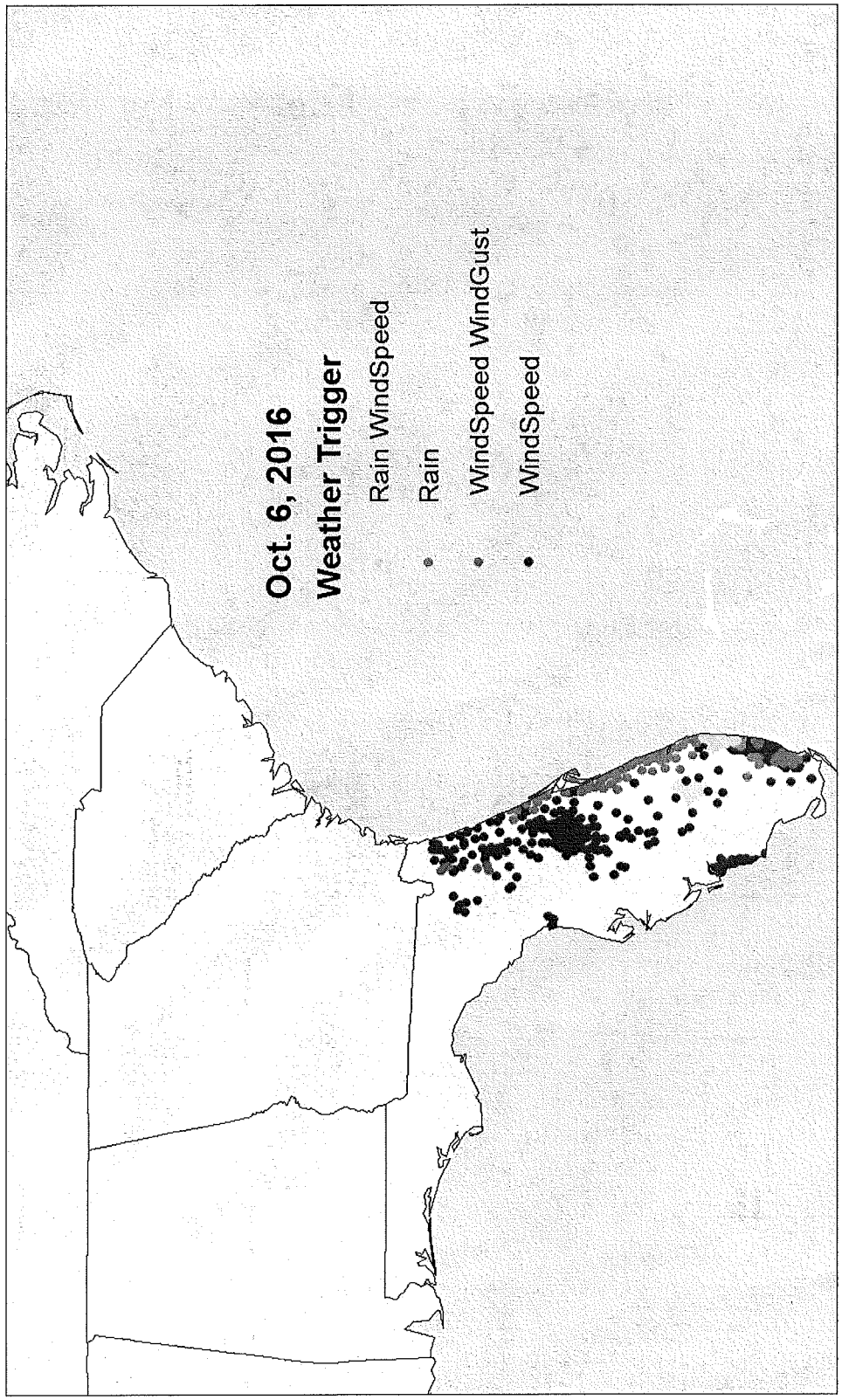
FIGS. 12-14 illustrate the locations of alerts that may be output based on forecasted weather conditions according to exemplary embodiments of the present invention.
Figure 13:
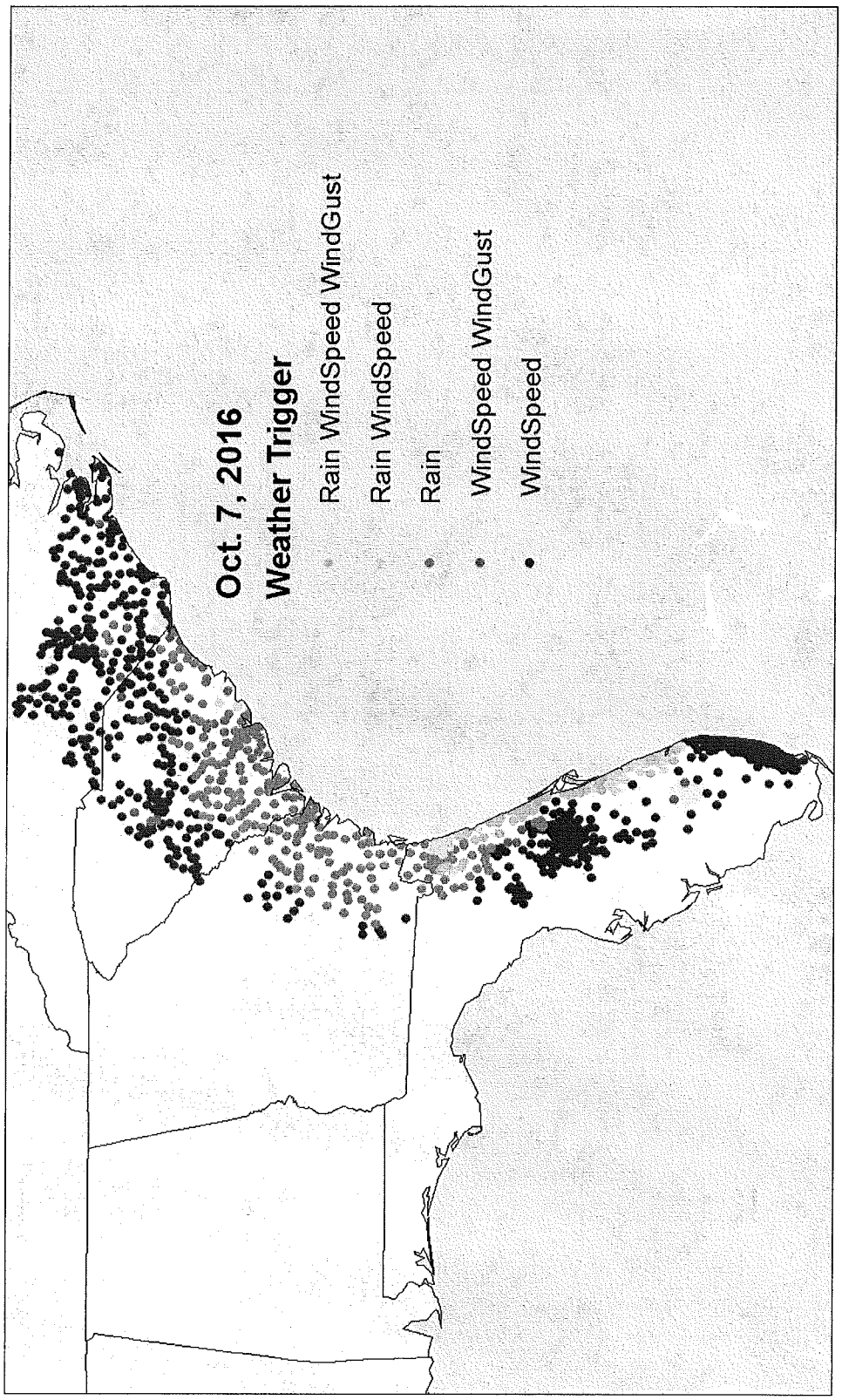
Figure 14:
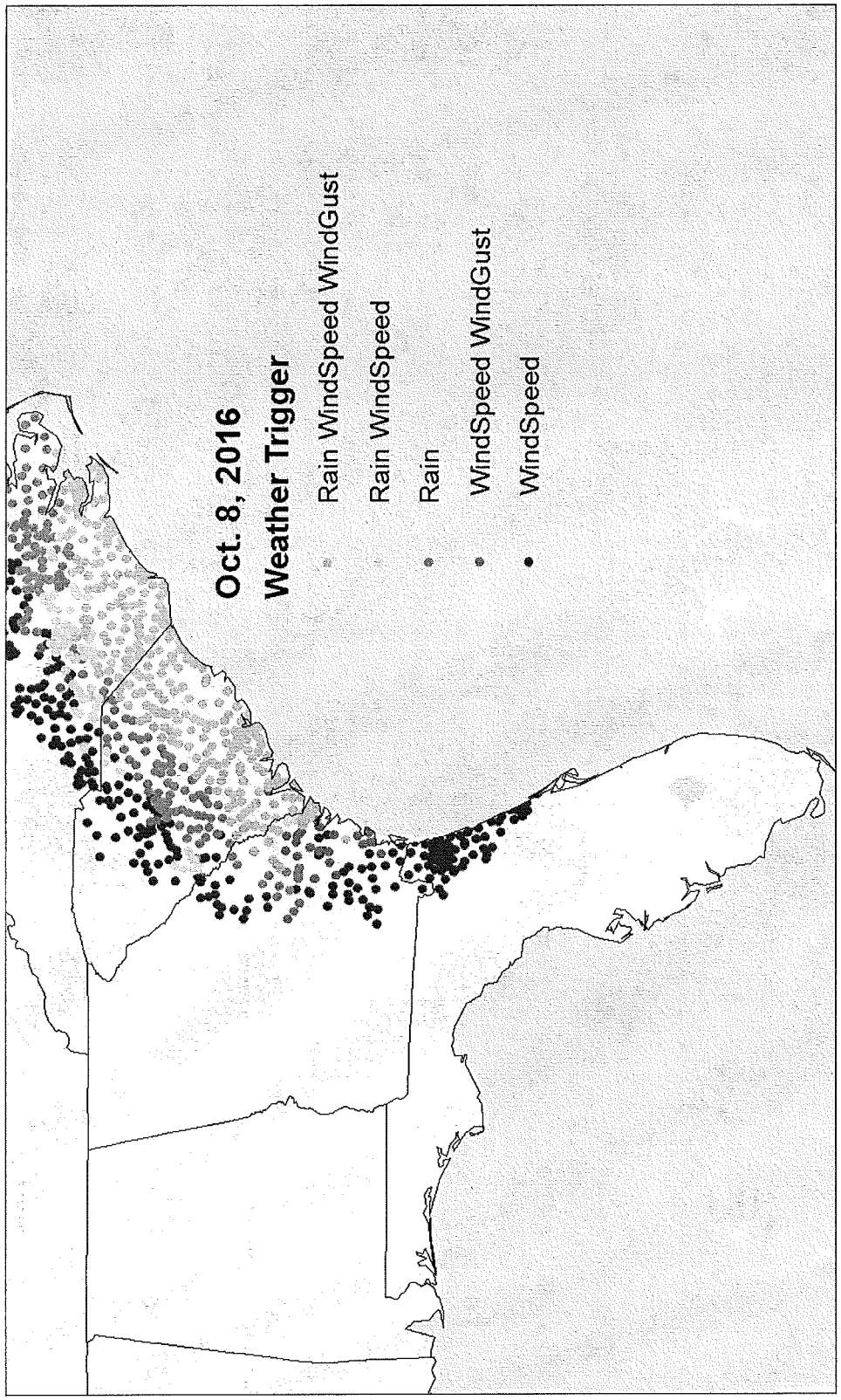

FIGS. 12-14 illustrate the locations of alerts that may be output based on forecasted weather conditions (in this example, the forecasted weather conditions for Hurricane Matthew) according to exemplary embodiments of the present invention.

The peril index analytics system 100 may also predict the impact of forecasted environmental events using a similar process as described above with respect to forecasted weather events.

Figure 15:
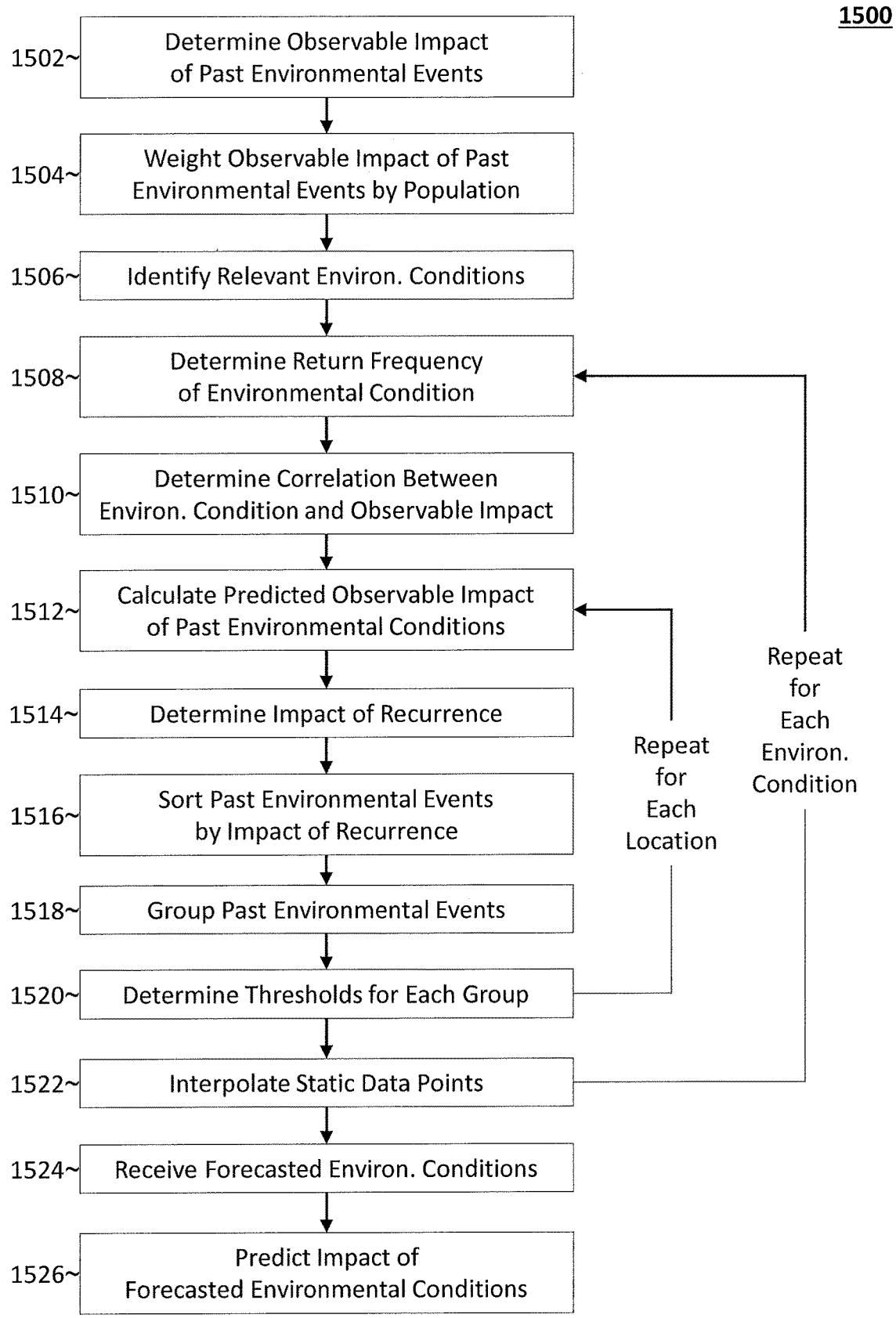
FIG. 15 is a flow chart of a process for predicting the impact of forecasted environmental conditions.

FIG. 15 is a flow chart of a process 1500 for predicting the impact of forecasted environmental conditions.

Similar to the process 300, the process 1500 may be performed by the analysis unit 180. Similar to step, 302, the observable impact of at least some of the past environmental events is determined in step 1502. Similar to step 304, the observable impact of each of the past environmental events may be weighted by population in step 1504. Similar to step 306, one or more relevant environmental conditions are determined in step 1506. Similar to step 308, the return frequency of each environmental condition is determined in step 1508. Similar to step 310, for each of the relevant environmental conditions, correlations are determined between those the past environmental conditions and the observable impact of those past environmental conditions in step 1510. Similar to step 312, the predicted observable impact of each of the past environmental conditions is calculated in step 312. Similar to step 314, the predicted impact of the past environmental events recurring is determined in step 1514. Similar to step 316, the past environmental events are sorted by the risk of the environmental condition recurring in step 1516. Similar to step 318, the past environmental events are grouped based on the predicted impact of the past weather events recurring in step 1518. Similar to step 320, thresholds are determined for each group in step 1520. Similar to step 322, the thresholds for the locations of the past environmental events may be interpolated for additional geographic locations in step 1522. Similar to step 324, forecasted environmental conditions are received in step 1524. Similar to step 326, the predicted impact of the forecasted environmental conditions is determined in step 1526.

As described above, the peril index analytics system 100 may output the predicted impact of the forecasted environmental conditions and/or output alerts based on the predicted impact of the forecasted environmental conditions.

Figure 16:
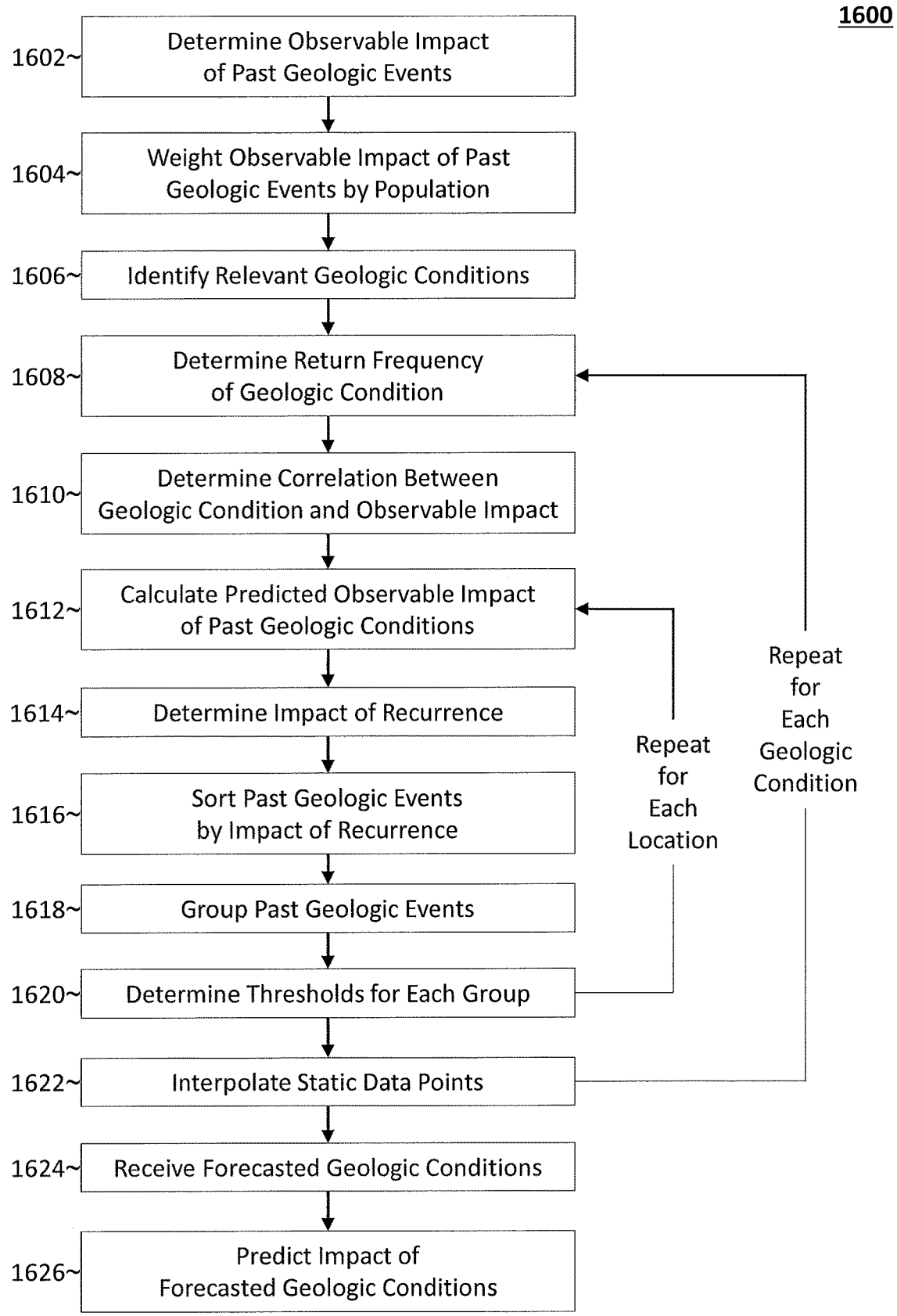
FIG. 16 is a flow chart of a process for predicting the impact of forecasted geologic conditions.

FIG. 16 is a flow chart of a process 1600 for predicting the impact of forecasted geologic conditions.

Similar to the process 300, the process 1600 may be performed by the analysis unit 180. Similar to step 302, the observable impact of at least some of the past geologic events is determined in step 1602. Similar to step 304, the observable impact of each of the past geologic events may be weighted by population in step 1604. Similar to step 306, one or more relevant geologic conditions are determined in step 1606. Similar to step 308, the return frequency of each geologic condition is determined in step 1608. Similar to step 310, for each of the relevant geologic conditions, correlations are determined between those the past geologic conditions and the observable impact of those past geologic conditions in step 1610. Similar to step 312, the predicted observable impact of each of the past geologic conditions is calculated in step 312. Similar to step 314, the predicted impact of the past geologic events recurring is determined in step 1614. Similar to step 316, the past geologic events are sorted by the risk of the geologic condition recurring in step 1616. Similar to step 318, the past geologic events are grouped based on the predicted impact of the past weather events recurring in step 1618. Similar to step 320, thresholds are determined for each group in step 1620. Similar to step 322, the thresholds for the locations of the past geologic events may be interpolated for additional geographic locations in step 1622. Similar to step 324, forecasted geologic conditions are received in step 1624. Similar to step 326, the predicted impact of the forecasted geologic conditions is determined in step 1626.

As described above, the peril index analytics system 100 may output the predicted impact of the forecasted geologic conditions and/or output alerts based on the predicted impact of the forecasted geologic conditions.

While a preferred embodiment has been set forth above, those skilled in the art who have reviewed the present disclosure will readily appreciate that other embodiments can be realized within the scope of the present invention. Disclosures of specific technologies are also illustrative rather than limiting. Therefore, the present invention should be construed as limited only by the claims.

The invention claimed is:

1. A method of predicting the financial impact of forecasted weather conditions, the method comprising:
   receiving information indicative of past weather events in a plurality of locations, each of the past weather events including one or more past weather conditions;
   receiving information indicative of the observable financial impact of at least some of the past weather events;
   for each of the plurality of locations and each of the one or more weather conditions:
      determining a recurrence interval of each of the past weather conditions in the plurality of locations;
      determining correlations between the past weather conditions and the observable financial impact of the past weather events;
      calculating a predicted observable financial impact of each of the past weather conditions;
      calculating a predicted financial impact of each of the past weather conditions recurring by multiplying the predicted observable financial impact the past weather condition by the recurrence interval of the past weather condition;
      grouping the past weather events into a plurality of groups based on the predicted financial impact of the past weather condition recurring; and
      determining a threshold for each of the plurality of groups;
   receiving forecasted weather conditions; and
   determining the predicted financial impact of the forecasted weather conditions by comparing the forecasted weather conditions with the thresholds determined for each of the groups in the locations of the forecasted weather events.

2. The method of claim 1, wherein the correlation between the past weather condition and the observable financial impact of the past weather event is determined using a regression algorithm.

3. The method of claim 1, further comprising:
   weighting the observable financial impact of past weather events by population.

4. The method of claim 1, further comprising:
interpolating the thresholds for the plurality of locations to determine thresholds for additional locations.

5. The method of claim 4, wherein the thresholds are interpolated using a Kriging technique.

6. The method of claim 1, wherein determining thresholds for each of the one or more weather conditions comprises determining thresholds for each of a plurality of weather conditions and each of the plurality of locations.

7. The method of claim 6, wherein the plurality of weather conditions include at least one of snow, rain, ice, wind, or temperature.

8. A system for predicting the financial impact of forecasted weather events, comprising:
one or more databases that store:
information indicative of past weather events in a plurality of locations, each of the past weather events including one or more past weather conditions; and
information indicative of the observable financial impact of at least some of the past weather events;
an analysis unit that:
for each of the plurality of locations and each of the one or more weather conditions:
determines a recurrence interval of each of the past weather conditions in the plurality of locations;
determines correlations between the past weather conditions and the observable financial impact of the past weather events;
calculates a predicted observable financial impact of each of the past weather conditions;
calculates a predicted financial impact of each of the past weather conditions recurring by multiplying the predicted observable financial impact the past weather condition by the recurrence interval of the past weather condition;
groups the past weather events into a plurality of groups based on the predicted financial impact of the past weather condition recurring; and
determines a threshold for each of the plurality of groups;
receives forecasted weather conditions; and
determines the predicted financial impact of the forecasted weather conditions by comparing the forecasted weather conditions with the thresholds determined for each of the groups in the locations of the forecasted weather events.

9. The system of claim 8, wherein the analysis unit is further configured to determine the correlation between the past weather condition and the observable financial impact of the past weather event using a regression algorithm.

10. The system of claim 8, wherein the analysis unit is further configured to weight the observable financial impact of past weather events by population.

11. The system of claim 8, wherein the analysis unit is further configured to interpolate the thresholds for the plurality of locations to determine thresholds for additional locations.

12. The system of claim 11, wherein the analysis unit is further configured to interpolate the thresholds using a Kriging technique.

13. The system of claim 8, wherein the analysis unit is configured to determine thresholds for each of a plurality of weather conditions in each of a plurality of locations.

14. The system of claim 13, wherein the plurality of weather conditions include at least one of snow, rain, ice, wind, or temperature.

15. A non-transitory computer-readable storage medium storing instructions that, when executed by a computer process, cause a computing device to:
receive information indicative of past weather events in a plurality of locations, each of the past weather events including one or more past weather conditions;
receive information indicative of the observable financial impact of at least some of the past weather events;
for each of the plurality of locations and each of the one or more weather conditions:
determine a recurrence interval of each of the past weather conditions in the plurality of locations;
determine the correlation between the past weather condition and the observable financial impact of the past weather event;
calculate a predicted observable financial impact of each of the past weather events;
calculate a predicted financial impact of each of the past weather events recurring by multiplying the predicted observable financial impact the past weather event by the recurrence interval of the past weather condition;
group the past weather events into a plurality of groups based on the predicted financial impact of the past weather condition recurring; and
determine threshold for each of the plurality of groups;
receive forecasted weather conditions; and
determine the predicted financial impact of the forecasted weather conditions by comparing the forecasted weather conditions with the thresholds determined for each of the groups in the locations of the forecasted weather events.

16. The computer-readable storage medium of claim 15, wherein the instructions further cause the computing device to determine the correlation between the past weather condition and the observable financial impact of the past weather event using a regression algorithm.

17. The computer-readable storage medium of claim 15, wherein the instructions further cause the computing device to weight the observable financial impact of past weather events by population.

18. The computer-readable storage medium of claim 15, wherein the instructions further cause the computing device to interpolate the thresholds for the plurality of locations to determine thresholds for additional locations.

19. The computer-readable storage medium of claim 15, wherein the instructions further cause the computing device to determine thresholds for each of a plurality of weather conditions in each of a plurality of locations.

20. The computer-readable storage medium of claim 19, wherein the plurality of weather conditions include at least one of snow, rain, ice, wind, or temperature.

* * * * *